US009758951B2

(12) United States Patent
Evans et al.

(10) Patent No.: US 9,758,951 B2
(45) Date of Patent: Sep. 12, 2017

(54) ELECTRONIC PLUMBING FIXTURE FITTING

(71) Applicants: Kenneth E. Evans, Westlake, OH (US); Terrence A. Pagano, North Royalton, OH (US); Harshil Parikh, North Olmsted, OH (US); Inho Song, Chesterland, OH (US); Eric M. Weber, Medina, OH (US)

(72) Inventors: Kenneth E. Evans, Westlake, OH (US); Terrence A. Pagano, North Royalton, OH (US); Harshil Parikh, North Olmsted, OH (US); Inho Song, Chesterland, OH (US); Eric M. Weber, Medina, OH (US)

(73) Assignee: Moen Incorporated, North Olmsted, OH (US)

( * ) Notice: Subject to any disclaimer, the term of this patent is extended or adjusted under 35 U.S.C. 154(b) by 884 days.

(21) Appl. No.: 13/788,725

(22) Filed: Mar. 7, 2013

(65) Prior Publication Data
US 2013/0248620 A1  Sep. 26, 2013

Related U.S. Application Data

(60) Provisional application No. 61/607,860, filed on Mar. 7, 2012.

(51) Int. Cl.
*E03C 1/05* (2006.01)
*E03C 1/04* (2006.01)
(Continued)

(52) U.S. Cl.
CPC .............. *E03C 1/057* (2013.01); *E03C 1/04* (2013.01); *E03C 1/0401* (2013.01);
(Continued)

(58) Field of Classification Search
CPC .......... E03C 1/04; E03C 1/0402; E03C 1/055; E03C 1/057; E03C 2001/0415;
(Continued)

(56) References Cited

U.S. PATENT DOCUMENTS 3,415,278 A  12/1968  Yamamoto et al.
3,450,159 A   6/1969  Wilkin
(Continued)

FOREIGN PATENT DOCUMENTS

DE  10237943 A1  2/2004
EP   0763368 A2  3/1997
(Continued)

OTHER PUBLICATIONS

International Search Report for International App. No. PCT/US2013/029650 dated May 13, 2013 (3 pages).
Written Opinion of the International Searching Authority for International App. No. PCT/US2013/029650 dated May 13, 2013 (11 pages).
(Continued)

*Primary Examiner* — Allana Lewin Bidder
*Assistant Examiner* — William R Klotz
(74) *Attorney, Agent, or Firm* — Calfee, Halter & Griswold LLP

(57) ABSTRACT

The present invention provides an electronic plumbing fixture fitting, such as an electronic faucet. The electronic plumbing fixture fitting includes a wand hose and a hose bracket. The hose bracket is operable to connect to a mounting shank and to the wand hose. The hose bracket is operable to position the wand hose between a mixed water outlet of a flow module and an inlet of the mounting shank such that a portion of the wand hose extends in a loop between the hose bracket and the inlet of the mounting shank. When installed, the hose bracket is in direct contact with the wand hose between the mixed water outlet of the flow module and the inlet of the mounting shank.

21 Claims, 18 Drawing Sheets

(51) Int. Cl.
 *F16K 11/00* (2006.01)
 *G01V 8/10* (2006.01)
 *E03C 1/02* (2006.01)
(52) U.S. Cl.
 CPC .............. *E03C 1/0402* (2013.01); *E03C 1/05* (2013.01); *E03C 1/055* (2013.01); *F16K 19/006* (2013.01); *G01V 8/10* (2013.01); *E03C 2001/026* (2013.01); *E03C 2001/0415* (2013.01); *Y10T 137/7737* (2015.04); *Y10T 137/87281* (2015.04); *Y10T 137/87338* (2015.04); *Y10T 137/87507* (2015.04); *Y10T 137/87579* (2015.04); *Y10T 137/87692* (2015.04); *Y10T 137/87917* (2015.04); *Y10T 137/9464* (2015.04)
(58) Field of Classification Search
 CPC .... E03C 1/0401; E03C 1/0404; F16K 19/006; Y10T 137/7737; Y10T 137/87281; Y10T 137/87338; Y10T 137/87507; Y10T 137/87579; Y10T 137/87917; Y10T 137/9464; F16L 3/01; F16L 3/1226
 USPC .... 4/623, 675–676, 678, 654, 661; 137/801; 251/129.01
 See application file for complete search history.

(56) References Cited

U.S. PATENT DOCUMENTS

| | | |
|---|---|---|
| 3,505,692 A | 4/1970 | Forbes |
| 3,576,277 A | 4/1971 | Blackmon |
| 3,585,652 A | 6/1971 | Forbes et al. |
| 3,585,653 A | 6/1971 | Forbes et al. |
| 3,670,167 A | 6/1972 | Forbes |
| 4,029,121 A | 6/1977 | Buzzi |
| 4,141,091 A | 2/1979 | Pulvari |
| 4,189,792 A | 2/1980 | Veach |
| 4,237,562 A | 12/1980 | DuPont |
| 4,258,444 A | 3/1981 | Orszullok |
| 4,309,781 A | 1/1982 | Lissau |
| 4,359,186 A | 11/1982 | Kiendl |
| 4,402,095 A | 9/1983 | Pepper |
| 4,404,697 A | 9/1983 | Hatcher |
| 4,420,811 A | 12/1983 | Tarnay et al. |
| 4,429,422 A | 2/1984 | Wareham |
| 4,487,333 A | 12/1984 | Pounder et al. |
| 4,558,817 A | 12/1985 | Kiendl |
| 4,606,085 A | 8/1986 | Davies |
| 4,618,091 A | 10/1986 | Buzzi |
| 4,682,626 A | 7/1987 | Bergmann |
| 4,682,728 A | 7/1987 | Oudenhoven et al. |
| 4,688,273 A | 8/1987 | Lyng |
| 4,688,277 A | 8/1987 | Kakinoki et al. |
| 4,696,428 A | 9/1987 | Shakalis |
| 4,697,614 A | 10/1987 | Powers et al. |
| 4,716,605 A | 1/1988 | Shepherd et al. |
| 4,735,357 A | 4/1988 | Gregory et al. |
| 4,742,583 A | 5/1988 | Yoshida et al. |
| 4,753,265 A | 6/1988 | Barrett et al. |
| 4,756,030 A | 7/1988 | Juliver |
| 4,762,273 A | 8/1988 | Gregory et al. |
| 4,784,303 A | 11/1988 | Ahad et al. |
| 4,823,414 A | 4/1989 | Piersimoni et al. |
| 4,839,039 A | 6/1989 | Parsons et al. |
| 4,884,725 A | 12/1989 | Ahad et al. |
| 4,894,874 A | 1/1990 | Wilson |
| 4,896,658 A | 1/1990 | Yonekubo et al. |
| 4,909,435 A | 3/1990 | Kidouchi et al. |
| 4,915,347 A | 4/1990 | Iqbal et al. |
| 4,921,211 A | 5/1990 | Novak et al. |
| 4,945,943 A | 8/1990 | Cogger |
| 4,955,535 A | 9/1990 | Tsutsui et al. |
| 4,965,894 A | 10/1990 | Baus |
| 4,967,794 A | 11/1990 | Tsutsui et al. |
| 4,968,152 A | 11/1990 | Bergmann |
| 4,971,106 A | 11/1990 | Tsutsui et al. |
| 4,974,636 A | 12/1990 | Cogger |
| 4,981,158 A | 1/1991 | Brondolino et al. |
| 4,985,944 A | 1/1991 | Shaw |
| 4,998,673 A | 3/1991 | Pilolla |
| 5,025,516 A | 6/1991 | Wilson |
| 5,033,508 A | 7/1991 | Laverty, Jr. |
| 5,058,804 A | 10/1991 | Yonekubo et al. |
| 5,060,323 A | 10/1991 | Shaw |
| 5,085,399 A | 2/1992 | Tsutsui et al. |
| 5,092,560 A | 3/1992 | Chen |
| 5,095,945 A | 3/1992 | Jensen |
| 5,135,028 A | 8/1992 | Rickenbach et al. |
| 5,139,044 A | 8/1992 | Otten et al. |
| 5,148,735 A | 9/1992 | Veletovac |
| 5,160,197 A | 11/1992 | Klose |
| 5,170,361 A | 12/1992 | Reed |
| 5,170,514 A | 12/1992 | Weigert |
| 5,170,944 A | 12/1992 | Shirai |
| 5,174,495 A | 12/1992 | Eichholz et al. |
| 5,184,642 A | 2/1993 | Powell |
| 5,199,639 A | 4/1993 | Kobayashi et al. |
| 5,199,790 A | 4/1993 | Pawelzik et al. |
| 5,217,035 A | 6/1993 | Van Marcke |
| 5,224,509 A | 7/1993 | Tanaka et al. |
| 5,226,629 A | 7/1993 | Millman et al. |
| 5,318,070 A | 6/1994 | Surabian |
| 5,322,086 A | 6/1994 | Sullivan |
| 5,341,839 A | 8/1994 | Kobayashi et al. |
| 5,351,347 A | 10/1994 | Kunkel |
| 5,362,026 A | 11/1994 | Kobayashi et al. |
| 5,458,147 A | 10/1995 | Mauerhofer |
| 5,458,288 A | 10/1995 | Mullick et al. |
| 5,462,224 A | 10/1995 | Enoki et al. |
| 5,482,250 A | 1/1996 | Kodaira |
| 5,494,077 A | 2/1996 | Enoki et al. |
| 5,508,510 A | 4/1996 | Laverty, Jr. et al. |
| 5,548,854 A | 8/1996 | Bloemer et al. |
| 5,549,273 A | 8/1996 | Aharon |
| 5,551,630 A | 9/1996 | Enoki et al. |
| 5,566,702 A | 10/1996 | Philipp |
| 5,570,869 A | 11/1996 | Diaz et al. |
| 5,586,746 A | 12/1996 | Humpert et al. |
| 5,588,636 A | 12/1996 | Eichholz et al. |
| 5,594,238 A | 1/1997 | Endruschat et al. |
| 5,618,023 A | 4/1997 | Eichholz et al. |
| 5,647,530 A | 7/1997 | Lorch |
| 5,651,384 A | 7/1997 | Rudrich |
| 5,694,653 A | 12/1997 | Harald |
| 5,730,165 A | 3/1998 | Philipp |
| 5,743,511 A | 4/1998 | Eichholz et al. |
| 5,758,688 A | 6/1998 | Hamanaka et al. |
| 5,781,942 A | 7/1998 | Allen et al. |
| 5,813,655 A | 9/1998 | Pinchott et al. |
| 5,819,336 A | 10/1998 | Gilliam et al. |
| 5,829,072 A | 11/1998 | Hirsch et al. |
| 5,855,356 A | 1/1999 | Fait |
| 5,862,844 A | 1/1999 | Perrin |
| 5,904,291 A | 5/1999 | Knapp |
| 5,911,240 A | 6/1999 | Kolar et al. |
| 5,915,417 A | 6/1999 | Diaz et al. |
| 5,918,855 A | 7/1999 | Hamanaka et al. |
| 5,921,280 A | 7/1999 | Ericksen et al. |
| 5,943,712 A | 8/1999 | Van Marcke |
| 5,961,095 A | 10/1999 | Schrott |
| 5,984,262 A | 11/1999 | Parsons et al. |
| 6,003,170 A | 12/1999 | Humpert et al. |
| 6,059,192 A | 5/2000 | Zosimadis |
| 6,067,673 A | 5/2000 | Paese et al. |
| 6,076,550 A | 6/2000 | Hiraishi et al. |
| 6,127,671 A | 10/2000 | Parsons et al. |
| 6,170,799 B1 | 1/2001 | Nelson |
| 6,189,163 B1 | 2/2001 | Van Marcke |
| 6,202,980 B1 | 3/2001 | Vincent et al. |
| 6,206,340 B1 | 3/2001 | Paese et al. |
| 6,212,697 B1 | 4/2001 | Parsons et al. |
| 6,215,116 B1 | 4/2001 | Van Marcke |

(56) References Cited

U.S. PATENT DOCUMENTS

| | | | |
|---|---|---|---|
| 6,219,859 | B1 | 4/2001 | Derakhshan |
| 6,250,601 | B1 | 6/2001 | Kolar et al. |
| 6,273,394 | B1 | 8/2001 | Vincent et al. |
| 6,279,777 | B1 | 8/2001 | Goodin et al. |
| 6,283,139 | B1 | 9/2001 | Symonds et al. |
| 6,286,764 | B1 | 9/2001 | Garvey et al. |
| 6,305,663 | B1 | 10/2001 | Miller |
| 6,321,785 | B1 | 11/2001 | Bergmann |
| 6,340,032 | B1 | 1/2002 | Zosimadis |
| 6,360,380 | B1 | 3/2002 | Swart et al. |
| 6,363,549 | B2 | 4/2002 | Humpert et al. |
| 6,381,770 | B1 * | 5/2002 | Raisch ............... E03C 1/0404 4/567 |
| 6,388,609 | B2 | 5/2002 | Paese et al. |
| 6,390,125 | B2 | 5/2002 | Pawelzik et al. |
| 6,418,359 | B1 | 7/2002 | Wolf et al. |
| 6,431,389 | B1 | 8/2002 | Jerstroem et al. |
| 6,438,770 | B1 | 8/2002 | Hed et al. |
| 6,446,875 | B1 | 9/2002 | Brooks et al. |
| RE37,888 | E | 10/2002 | Cretu-Petra |
| D463,845 | S | 10/2002 | Spangler et al. |
| D464,111 | S | 10/2002 | Spangler et al. |
| D464,112 | S | 10/2002 | Spangler et al. |
| D464,396 | S | 10/2002 | Spangler et al. |
| D464,397 | S | 10/2002 | Spangler et al. |
| D464,398 | S | 10/2002 | Spangler et al. |
| D464,709 | S | 10/2002 | Spangler et al. |
| D465,007 | S | 10/2002 | Spangler et al. |
| 6,461,323 | B2 | 10/2002 | Fowler et al. |
| D465,264 | S | 11/2002 | Spangler et al. |
| D465,554 | S | 11/2002 | Spangler et al. |
| 6,473,917 | B1 | 11/2002 | Mateina |
| 6,478,285 | B1 | 11/2002 | Bergmann |
| 6,481,634 | B1 | 11/2002 | Zosimadis |
| 6,481,983 | B1 | 11/2002 | Miller |
| 6,509,652 | B2 | 1/2003 | Yumita |
| 6,513,787 | B1 | 2/2003 | Jeromson et al. |
| D471,962 | S | 3/2003 | Spangler et al. |
| 6,561,481 | B1 | 5/2003 | Filonczuk |
| 6,568,655 | B2 | 5/2003 | Paese et al. |
| 6,598,245 | B2 | 7/2003 | Nishioka |
| 6,619,320 | B2 | 9/2003 | Parsons |
| 6,639,209 | B1 | 10/2003 | Patterson et al. |
| 6,641,727 | B1 | 11/2003 | Aldred et al. |
| D484,218 | S | 12/2003 | Moore |
| D485,888 | S | 1/2004 | Moore |
| 6,671,890 | B2 | 1/2004 | Nishioka |
| 6,676,024 | B1 | 1/2004 | McNerney et al. |
| 6,688,530 | B2 | 2/2004 | Wack et al. |
| 6,691,340 | B2 | 2/2004 | Honda et al. |
| 6,695,281 | B2 | 2/2004 | Williams, Jr. |
| 6,724,873 | B2 | 4/2004 | Senna Da Silva |
| 6,731,209 | B2 | 5/2004 | Wadlow et al. |
| 6,734,685 | B2 | 5/2004 | Rudrich |
| 6,753,554 | B1 | 6/2004 | Gomes et al. |
| 6,770,869 | B2 | 8/2004 | Patterson et al. |
| 6,826,455 | B1 | 11/2004 | Iott et al. |
| 6,854,658 | B1 | 2/2005 | Houghton et al. |
| 6,862,754 | B1 | 3/2005 | DeMarco |
| 6,874,535 | B2 | 4/2005 | Parsons et al. |
| 6,876,100 | B2 | 4/2005 | Yumita |
| 6,879,863 | B2 | 4/2005 | Mueller et al. |
| 6,892,952 | B2 | 5/2005 | Chang et al. |
| 6,894,270 | B2 | 5/2005 | Bailey |
| 6,910,501 | B2 | 6/2005 | Marty et al. |
| 6,913,203 | B2 | 7/2005 | DeLangis |
| 6,925,999 | B2 | 8/2005 | Hugghins et al. |
| 6,955,333 | B2 | 10/2005 | Patterson et al. |
| 6,962,168 | B2 | 11/2005 | McDaniel et al. |
| 6,964,404 | B2 | 11/2005 | Patterson et al. |
| 6,968,860 | B1 | 11/2005 | Haenlein et al. |
| 6,993,415 | B2 | 1/2006 | Bauer et al. |
| 6,995,670 | B2 | 2/2006 | Wadlow et al. |
| 6,996,863 | B2 | 2/2006 | Kaneko |
| 7,007,915 | B2 | 3/2006 | Vincent et al. |
| 7,014,166 | B1 | 3/2006 | Wang |
| 7,046,163 | B2 | 5/2006 | Macey |
| 7,069,941 | B2 | 7/2006 | Parsons et al. |
| 7,075,768 | B2 | 7/2006 | Kaneko |
| 7,076,814 | B2 | 7/2006 | Ostrowski et al. |
| 7,083,156 | B2 | 8/2006 | Jost et al. |
| 7,090,154 | B2 * | 8/2006 | Herring ............... E03C 1/0404 137/801 |
| 7,104,473 | B2 | 9/2006 | Bosio |
| 7,107,631 | B2 | 9/2006 | Lang et al. |
| 7,150,293 | B2 | 12/2006 | Jonte |
| D541,907 | S | 5/2007 | Qing |
| 7,228,874 | B2 | 6/2007 | Bolderheij et al. |
| 7,232,111 | B2 | 6/2007 | McDaniel et al. |
| 7,240,850 | B2 | 7/2007 | Beck et al. |
| 7,253,536 | B2 | 8/2007 | Fujimoto et al. |
| 7,278,624 | B2 | 10/2007 | Iott et al. |
| 7,308,724 | B2 | 12/2007 | Ho |
| 7,325,257 | B2 | 2/2008 | Kolar et al. |
| 7,325,747 | B2 | 2/2008 | Jonte |
| D563,908 | S | 3/2008 | Kohler, Jr. et al. |
| 7,343,930 | B2 | 3/2008 | Rosko |
| 7,396,000 | B2 | 7/2008 | Parsons et al. |
| 7,448,553 | B2 | 11/2008 | Schmitt |
| 7,458,520 | B2 | 12/2008 | Belz et al. |
| 7,464,418 | B2 | 12/2008 | Seggio et al. |
| 7,472,433 | B2 | 1/2009 | Rodenbeck et al. |
| 7,475,827 | B2 | 1/2009 | Schmitt |
| 7,516,939 | B2 | 4/2009 | Bailey |
| 7,537,023 | B2 | 5/2009 | Marty et al. |
| 7,537,195 | B2 | 5/2009 | McDaniel et al. |
| 7,558,650 | B2 | 7/2009 | Thornton et al. |
| 7,584,898 | B2 | 9/2009 | Schmitt et al. |
| 7,608,936 | B2 | 10/2009 | Shimizu et al. |
| 7,614,096 | B2 | 11/2009 | Vincent |
| 7,624,757 | B2 | 12/2009 | Schmitt |
| 7,625,667 | B2 | 12/2009 | Marty et al. |
| 7,627,909 | B2 | 12/2009 | Esche |
| 7,631,372 | B2 | 12/2009 | Marty et al. |
| 7,651,068 | B2 | 1/2010 | Bailey |
| 7,669,776 | B2 | 3/2010 | Beck et al. |
| 7,690,395 | B2 | 4/2010 | Jonte et al. |
| 7,690,623 | B2 | 4/2010 | Parsons et al. |
| 7,731,154 | B2 | 6/2010 | Parsons et al. |
| 7,743,782 | B2 | 6/2010 | Jost |
| 7,766,026 | B2 | 8/2010 | Boey |
| 7,784,481 | B2 | 8/2010 | Kunkel |
| 7,802,733 | B2 | 9/2010 | Schmitt |
| 7,806,141 | B2 | 10/2010 | Marty et al. |
| RE42,005 | E | 12/2010 | Jost et al. |
| 7,851,094 | B2 | 12/2010 | Burke et al. |
| 7,857,234 | B2 | 12/2010 | Daley et al. |
| 7,871,057 | B2 | 1/2011 | Shimizu et al. |
| 7,889,187 | B2 | 2/2011 | Freier et al. |
| 7,919,877 | B2 | 4/2011 | Shimizu et al. |
| 7,921,480 | B2 | 4/2011 | Parsons et al. |
| 7,938,339 | B2 | 5/2011 | Robert et al. |
| 7,946,504 | B2 | 5/2011 | Shapira et al. |
| 7,952,233 | B2 | 5/2011 | Bayley et al. |
| 7,956,480 | B2 | 6/2011 | Onodera et al. |
| 7,979,928 | B2 | 7/2011 | Allen, Jr. et al. |
| 7,997,301 | B2 | 8/2011 | Marty et al. |
| 8,006,712 | B2 | 8/2011 | Boey |
| 8,028,355 | B2 | 10/2011 | Reeder et al. |
| 8,049,155 | B2 | 11/2011 | Weigen |
| 8,089,473 | B2 | 1/2012 | Koottungal |
| 8,104,113 | B2 | 1/2012 | Rodenbeck et al. |
| 8,104,741 | B2 | 1/2012 | Weigen |
| 8,113,483 | B2 | 2/2012 | Bayley et al. |
| 8,118,240 | B2 | 2/2012 | Rodenbeck et al. |
| 8,127,782 | B2 | 3/2012 | Jonte et al. |
| 8,132,778 | B2 | 3/2012 | Connors |
| 8,162,236 | B2 | 4/2012 | Rodenbeck et al. |
| 8,171,578 | B2 | 5/2012 | Tsujita et al. |
| 8,208,255 | B2 | 6/2012 | Enomoto et al. |
| 8,212,994 | B2 | 7/2012 | Liu |
| 8,243,040 | B2 | 8/2012 | Koottungal |
| 8,250,680 | B2 | 8/2012 | Murata et al. |
| 8,256,039 | B2 | 9/2012 | Morotomi et al. |

(56) References Cited

U.S. PATENT DOCUMENTS

| | | |
|---|---|---|
| 8,272,077 B2 | 9/2012 | Hashimoto et al. |
| 8,274,036 B2 | 9/2012 | Weigen |
| 8,276,878 B2 | 10/2012 | Parsons et al. |
| 8,281,422 B2 | 10/2012 | Chen et al. |
| 8,296,875 B2 | 10/2012 | Loberger et al. |
| 8,317,110 B2 | 11/2012 | Aoyagi et al. |
| 8,333,361 B2 | 12/2012 | McTargett |
| 8,337,033 B2 | 12/2012 | Kaneda et al. |
| 8,355,822 B2 | 1/2013 | Jonte et al. |
| 8,364,546 B2 | 1/2013 | Yenni et al. |
| 8,365,767 B2 | 2/2013 | Davidson et al. |
| 8,376,313 B2 | 2/2013 | Burke et al. |
| 8,381,329 B2 | 2/2013 | Bayley et al. |
| 8,384,032 B2 | 2/2013 | Chen et al. |
| 8,387,171 B2 | 3/2013 | Farber et al. |
| 8,408,517 B2 | 4/2013 | Jonte et al. |
| 8,413,952 B2 | 4/2013 | Lang et al. |
| 8,418,993 B2 | 4/2013 | Chen |
| 8,421,020 B2 | 4/2013 | Chen et al. |
| 8,424,569 B2 | 4/2013 | Marty et al. |
| 8,430,118 B2 | 4/2013 | Xiong |
| 8,434,172 B2 | 5/2013 | Nowak et al. |
| 8,438,672 B2 | 5/2013 | Reeder et al. |
| 8,461,705 B2 | 6/2013 | Kuroishi et al. |
| 8,469,056 B2 | 6/2013 | Marty et al. |
| 8,479,324 B2 | 7/2013 | Chen et al. |
| 8,482,409 B2 | 7/2013 | Sawaski |
| 8,496,025 B2 | 7/2013 | Parsons et al. |
| 8,505,126 B2 | 8/2013 | Morotomi et al. |
| 8,516,628 B2 | 8/2013 | Conroy |
| 8,528,579 B2 | 9/2013 | Jonte et al. |
| 8,534,318 B2 | 9/2013 | Kanemaru et al. |
| 8,549,677 B2 | 10/2013 | Weigen et al. |
| 8,552,384 B2 | 10/2013 | Zhang et al. |
| 8,555,427 B2 | 10/2013 | Stauber et al. |
| 8,561,225 B2 | 10/2013 | Wilson et al. |
| 8,561,626 B2 | 10/2013 | Sawaski et al. |
| 8,567,430 B2 | 10/2013 | Allen et al. |
| 8,572,772 B2 | 11/2013 | Wolf et al. |
| 8,576,384 B2 | 11/2013 | Liu |
| 8,612,057 B2 | 12/2013 | Murata et al. |
| 8,613,419 B2 | 12/2013 | Rodenbeck et al. |
| 8,614,414 B2 | 12/2013 | Davidson et al. |
| 8,621,676 B2 | 1/2014 | Morotomi et al. |
| 8,625,084 B2 | 1/2014 | Tang et al. |
| 8,627,844 B2 | 1/2014 | Allen et al. |
| 8,635,717 B2 | 1/2014 | Wilson et al. |
| 8,646,476 B2 | 2/2014 | Thomas et al. |
| 8,683,625 B1 * | 4/2014 | Straub .................. F16L 3/01 4/654 |
| 8,686,344 B2 | 4/2014 | Weigen |
| 8,713,721 B2 | 5/2014 | Zhang et al. |
| 8,729,477 B2 | 5/2014 | Tang et al. |
| 8,766,195 B2 | 7/2014 | Tang et al. |
| 8,776,817 B2 | 7/2014 | Sawaski et al. |
| 8,820,705 B2 | 9/2014 | Davidson et al. |
| 8,827,239 B2 | 9/2014 | Chen |
| 8,827,240 B2 | 9/2014 | Chen |
| 2002/0019709 A1 | 2/2002 | Segal |
| 2003/0146307 A1 | 8/2003 | Herring |
| 2004/0041033 A1 | 3/2004 | Kemp |
| 2004/0155116 A1 | 8/2004 | Wack et al. |
| 2005/0205818 A1 | 9/2005 | Bayley et al. |
| 2005/0236594 A1 | 10/2005 | Lilly et al. |
| 2005/0253102 A1 | 11/2005 | Boilen |
| 2006/0130907 A1 | 6/2006 | Marty et al. |
| 2006/0138246 A1 | 6/2006 | Stowe et al. |
| 2006/0145111 A1 | 7/2006 | Lang et al. |
| 2006/0186215 A1 | 8/2006 | Logan |
| 2006/0202142 A1 | 9/2006 | Marty et al. |
| 2006/0214016 A1 | 9/2006 | Erdely et al. |
| 2006/0231637 A1 | 10/2006 | Schmitt |
| 2006/0231782 A1 | 10/2006 | Iott et al. |
| 2006/0253973 A1 | 11/2006 | Brooks |
| 2007/0028974 A1 | 2/2007 | Herring et al. |
| 2007/0069168 A1 | 3/2007 | Jonte |
| 2007/0069169 A1 | 3/2007 | Lin |
| 2007/0138421 A1 | 6/2007 | Gibson et al. |
| 2007/0204925 A1 | 9/2007 | Bolderheij et al. |
| 2007/0246550 A1 | 10/2007 | Rodenbeck et al. |
| 2008/0045794 A1 | 2/2008 | Belson |
| 2008/0256494 A1 | 10/2008 | Greenfield |
| 2008/0283785 A1 | 11/2008 | Kunkel |
| 2009/0000024 A1 | 1/2009 | Louis et al. |
| 2009/0114036 A1 | 5/2009 | Dhulipudi et al. |
| 2009/0154524 A1 | 6/2009 | Girelli |
| 2009/0188995 A1 | 7/2009 | Onodera et al. |
| 2009/0241248 A1 | 10/2009 | Vollmar et al. |
| 2010/0012194 A1 | 1/2010 | Jonte et al. |
| 2010/0096017 A1 | 4/2010 | Jonte et al. |
| 2010/0108165 A1 | 5/2010 | Rodenbeck et al. |
| 2010/0123013 A1 | 5/2010 | Beck et al. |
| 2010/0125946 A1 | 5/2010 | Meisner et al. |
| 2010/0132112 A1 | 6/2010 | Bayley et al. |
| 2010/0200789 A1 | 8/2010 | Connors |
| 2011/0005619 A1 | 1/2011 | Kanemaru et al. |
| 2011/0139282 A1 | 6/2011 | Loeck et al. |
| 2011/0169786 A1 | 7/2011 | Freier et al. |
| 2011/0185493 A1 | 8/2011 | Chen |
| 2011/0186135 A1 | 8/2011 | Hanna et al. |
| 2011/0186136 A1 | 8/2011 | Hanna et al. |
| 2011/0186137 A1 | 8/2011 | Hanna et al. |
| 2011/0186138 A1 | 8/2011 | Hanna et al. |
| 2011/0186161 A1 | 8/2011 | Chen |
| 2011/0284111 A1 | 11/2011 | Marty et al. |
| 2011/0302708 A1 | 12/2011 | Parsons et al. |
| 2012/0055557 A1 | 3/2012 | Belz et al. |
| 2012/0097874 A1 | 4/2012 | Rodenbeck et al. |
| 2012/0131744 A1 | 5/2012 | Bayley et al. |
| 2012/0139479 A1 | 6/2012 | Yun |
| 2012/0145249 A1 | 6/2012 | Rodenbeck et al. |
| 2012/0160349 A1 | 6/2012 | Jonte et al. |
| 2012/0174306 A1 | 7/2012 | Chen et al. |
| 2012/0227849 A1 | 9/2012 | Rodenbeck et al. |
| 2012/0246815 A1 | 10/2012 | Lin et al. |
| 2012/0267493 A1 | 10/2012 | Meehan et al. |
| 2012/0318364 A1 | 12/2012 | Sawaski et al. |
| 2013/0062422 A1 | 3/2013 | Marty et al. |
| 2013/0062437 A1 | 3/2013 | Hanna et al. |
| 2013/0067658 A1 | 3/2013 | Loberger et al. |
| 2013/0075483 A1 | 3/2013 | Marty et al. |
| 2013/0098489 A1 | 4/2013 | Meehan et al. |
| 2013/0100033 A1 | 4/2013 | Yuan et al. |
| 2013/0124247 A1 | 5/2013 | Yenni et al. |
| 2013/0145535 A1 | 6/2013 | Parsons et al. |
| 2013/0146160 A1 | 6/2013 | Davidson et al. |
| 2013/0159640 A1 | 6/2013 | Lu et al. |
| 2013/0160202 A1 | 6/2013 | Murata et al. |
| 2013/0162969 A1 | 6/2013 | Liu |
| 2013/0167953 A1 | 7/2013 | Kuroishi et al. |
| 2013/0170839 A1 | 7/2013 | Yuan |
| 2013/0185860 A1 | 7/2013 | Miyake et al. |
| 2013/0185861 A1 | 7/2013 | Matsumoto et al. |
| 2013/0186196 A1 | 7/2013 | Veros et al. |
| 2013/0205487 A1 | 8/2013 | Yagi et al. |
| 2013/0219614 A1 | 8/2013 | Bayley et al. |
| 2013/0239321 A1 | 9/2013 | Reeder et al. |
| 2013/0248617 A1 | 9/2013 | Sawaski et al. |
| 2013/0265270 A1 | 10/2013 | Tempas et al. |
| 2013/0265562 A1 | 10/2013 | Tang et al. |
| 2013/0276911 A1 | 10/2013 | Meehan et al. |
| 2013/0291950 A1 | 11/2013 | Sawaski |
| 2013/0312856 A1 | 11/2013 | Huffington et al. |
| 2013/0340158 A1 | 12/2013 | Stauber et al. |
| 2014/0000733 A1 | 1/2014 | Jonte et al. |
| 2014/0020168 A1 | 1/2014 | Blake et al. |
| 2014/0026308 A1 | 1/2014 | Wilson et al. |
| 2014/0026980 A1 | 1/2014 | Esche et al. |
| 2014/0034834 A1 | 2/2014 | Jian et al. |
| 2014/0041109 A1 | 2/2014 | Stauber et al. |
| 2014/0047629 A1 | 2/2014 | Stauber et al. |
| 2014/0053906 A1 | 2/2014 | Esche et al. |
| 2014/0053925 A1 | 2/2014 | Esche et al. |
| 2014/0054478 A1 | 2/2014 | Esche |

(56) References Cited

U.S. PATENT DOCUMENTS

| | | |
|---|---|---|
| 2014/0069520 A1 | 3/2014 | Esche et al. |
| 2014/0090718 A1 | 4/2014 | Allen et al. |
| 2014/0101836 A1 | 4/2014 | Wilson et al. |
| 2014/0102555 A1 | 4/2014 | Allen et al. |
| 2014/0109984 A1 | 4/2014 | Rodenbeck et al. |
| 2014/0116529 A1 | 5/2014 | Thomas et al. |
| 2014/0117265 A1 | 5/2014 | Cochart et al. |
| 2014/0123378 A1 | 5/2014 | Luettgen et al. |
| 2014/0143948 A1 | 5/2014 | Cochart |
| 2014/0158920 A1 | 6/2014 | Belz et al. |
| 2014/0159749 A1 | 6/2014 | Belz et al. |
| 2014/0161321 A1 | 6/2014 | Belz |
| 2014/0183279 A1 | 7/2014 | Hanna et al. |
| 2014/0229023 A1 | 8/2014 | Bomholt et al. |
| 2014/0231450 A1 | 8/2014 | Rosko et al. |

FOREIGN PATENT DOCUMENTS

| | | |
|---|---|---|
| JP | 58028076 A | 2/1983 |
| JP | 04102638 A | 4/1992 |
| JP | 06257198 A | 9/1994 |
| WO | 9117377 A1 | 11/1991 |
| WO | 2007059051 A2 | 5/2007 |
| WO | 2009095879 A2 | 8/2009 |

OTHER PUBLICATIONS

Extended European Search Report issued by the European Patent Office for European App. No. 13 757 770.6 dated May 18, 2016 (11 pages).

* cited by examiner

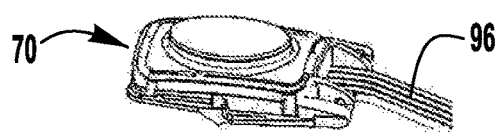
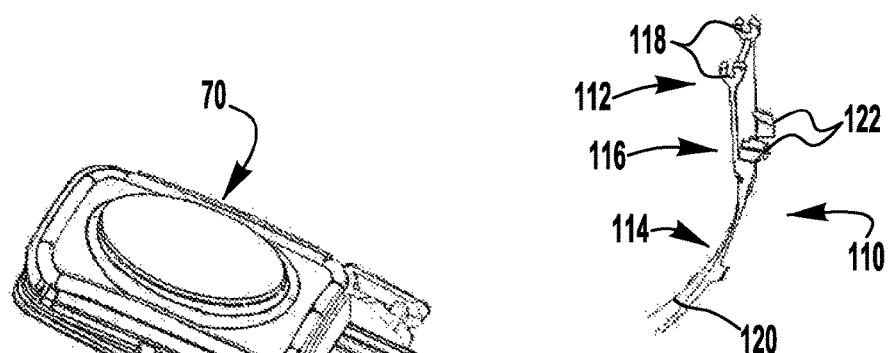
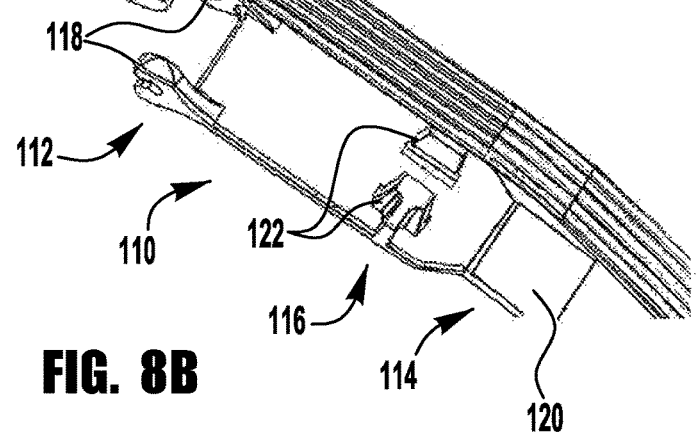

ELECTRONIC PLUMBING FIXTURE FITTING

CROSS-REFERENCE TO RELATED APPLICATION

This application claims the benefit of U.S. Provisional Application No. 61/607,860, filed Mar. 7, 2012, the entire disclosure of which is hereby incorporated by reference.

FIELD

The present invention relates generally to an electronic plumbing fixture fitting, such as an electronic faucet.

BACKGROUND

Electronic plumbing fixture fittings, such as electronic faucets, are well known. Such electronic plumbing fixture fittings are used in residential and commercial applications, such as in kitchens, bathrooms, and various other locations. Many difficulties can be encountered in manufacturing, assembling, installing, and using typical electronic plumbing fixture fittings.

SUMMARY

The present invention provides an electronic plumbing fixture fitting. In an exemplary embodiment, the electronic plumbing fixture fitting comprises a housing, a mounting shank, an electronic valve, a flow module, a wand hose, and a hose bracket. The housing is operable to mount above a mounting surface. The housing includes a spout and a wand. The wand is operable to pull away from the spout. The wand includes a discharge outlet operable to deliver water. The mounting shank is operable to extend downwardly from the housing. The mounting shank is operable to extend through and below the mounting surface. The mounting shank has a hollow interior. The mounting shank has an inlet. The electronic valve is operable to permit flow of water through the discharge outlet when the electronic valve is activated and to prevent flow of water through the discharge outlet when the electronic valve is deactivated. The flow module is operable to mount below the mounting surface. The electronic valve is located inside the flow module. The flow module includes a cold water inlet operable to receive cold water from a cold water supply, a cold water passage operable to fluidly connect the cold water inlet and the electronic valve, a hot water inlet operable to receive hot water from a hot water supply, a hot water passage operable to fluidly connect the hot water inlet and the electronic valve, a mixed water outlet operable to discharge mixed water to the discharge outlet, and a mixed water passage operable to fluidly connect the electronic valve and the mixed water outlet. The wand hose is operable to fluidly connect the mixed water outlet and the wand. The wand hose extends below the mounting surface and through the mounting shank and the spout. The hose bracket is operable to connect to the mounting shank and to the wand hose. The hose bracket is operable to position the wand hose between the mixed water outlet and the inlet of the mounting shank such that a portion of the wand hose extends in a loop between the hose bracket and the inlet of the mounting shank.

In another exemplary embodiment, the electronic plumbing fixture fitting comprises a housing, a mounting shank, an electronic valve, a sensor, a flow module, an electronics module, a wand hose, and a hose bracket. The housing is operable to mount above a mounting surface. The housing includes a spout and a wand. The wand is operable to pull away from the spout. The wand includes a discharge outlet operable to deliver water. The mounting shank is operable to extend downwardly from the housing. The mounting shank is operable to extend through and below the mounting surface. The mounting shank has a hollow interior. The mounting shank has an inlet. The electronic valve is operable to permit flow of water through the discharge outlet when the electronic valve is activated and to prevent flow of water through the discharge outlet when the electronic valve is deactivated. The sensor is operable to send a signal when the electronic valve is to be activated. The flow module is operable to mount below the mounting surface. The electronic valve is located inside the flow module. The flow module includes a cold water inlet operable to receive cold water from a cold water supply, a cold water passage operable to fluidly connect the cold water inlet and the electronic valve, a hot water inlet operable to receive hot water from a hot water supply, a hot water passage operable to fluidly connect the hot water inlet and the electronic valve, a mixed water outlet operable to discharge mixed water to the discharge outlet, and a mixed water passage operable to fluidly connect the electronic valve and the mixed water outlet. The electronics module is operable to receive the signal from the sensor when the electronic valve is to be activated and, in response, send a signal to the electronic valve to activate the electronic valve. The electronics module is operable to connect to the flow module. The wand hose is operable to fluidly connect the mixed water outlet and the wand. The wand hose extends below the mounting surface and through the mounting shank and the spout. The hose bracket is operable to connect to the mounting shank and to the wand hose. The hose bracket is operable to position the wand hose between the mixed water outlet and the inlet of the mounting shank such that a portion of the wand hose extends in a loop between the hose bracket and the inlet of the mounting shank.

In a further exemplary embodiment, the electronic plumbing fixture fitting comprises a housing, a mounting shank, a mechanical valve, an electronic valve, a flow module, a wand hose, and a hose bracket. The housing is operable to mount above a mounting surface. The housing includes a spout and a wand. The wand is operable to pull away from the spout. The wand includes a discharge outlet operable to deliver water. The mounting shank is operable to extend downwardly from the housing. The mounting shank is operable to extend through and below the mounting surface. The mounting shank has a hollow interior. The mounting shank has an inlet. The mechanical valve is operable to permit flow of water through the discharge outlet when the mechanical valve is opened and to prevent flow of water through the discharge outlet when the mechanical valve is closed. The electronic valve is operable to permit flow of water through the discharge outlet when the electronic valve is activated and to prevent flow of water through the discharge outlet when the electronic valve is deactivated. The flow module is operable to mount below the mounting surface. The mechanical valve is located outside the flow module. The electronic valve is located inside the flow module. The flow module includes a cold water inlet operable to receive cold water from a cold water supply, a cold water outlet operable to discharge cold water to the mechanical valve, a first cold water passage operable to fluidly connect the cold water inlet and the cold water outlet, a second cold water passage operable to fluidly connect the cold water inlet and the electronic valve, a hot water inlet operable to receive hot water from a hot water supply, a hot water outlet operable to discharge hot water to the mechanical valve, a first hot water passage operable to fluidly connect the hot water inlet and the hot water outlet, a second hot water passage operable to fluidly connect the hot water inlet and the electronic valve, a mixed water inlet operable to receive mixed water from the mechanical valve, a mixed water outlet operable to discharge mixed water to the discharge outlet, a first mixed water passage operable to fluidly connect the mixed water inlet and the mixed water outlet, and a second mixed water passage operable to fluidly connect the electronic valve and the mixed water outlet. The wand hose is operable to fluidly connect the mixed water outlet and the wand. The wand hose extends below the mounting surface and through the mounting shank and the spout. The hose bracket is operable to connect to the mounting shank and to the wand hose. The hose bracket is operable to position the wand hose between the mixed water outlet and the inlet of the mounting shank such that a portion of the wand hose extends in a loop between the hose bracket and the inlet of the mounting shank.

BRIEF DESCRIPTION OF THE DRAWINGS

FIGS. 8A-8B are perspective views of certain components of the electronic faucet of FIG. 3, including the toggle sensor and a cable protector before being connected together;

-FIG. 10A is a perspective view, FIG. 10B is a top plan view, FIG. 10C is a front elevational view, and FIG. 10D is a bottom plan view;

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showerhead, an electronic handheld shower, an electronic body spray, or any other electronic plumbing fixture fitting.

Figure 1:
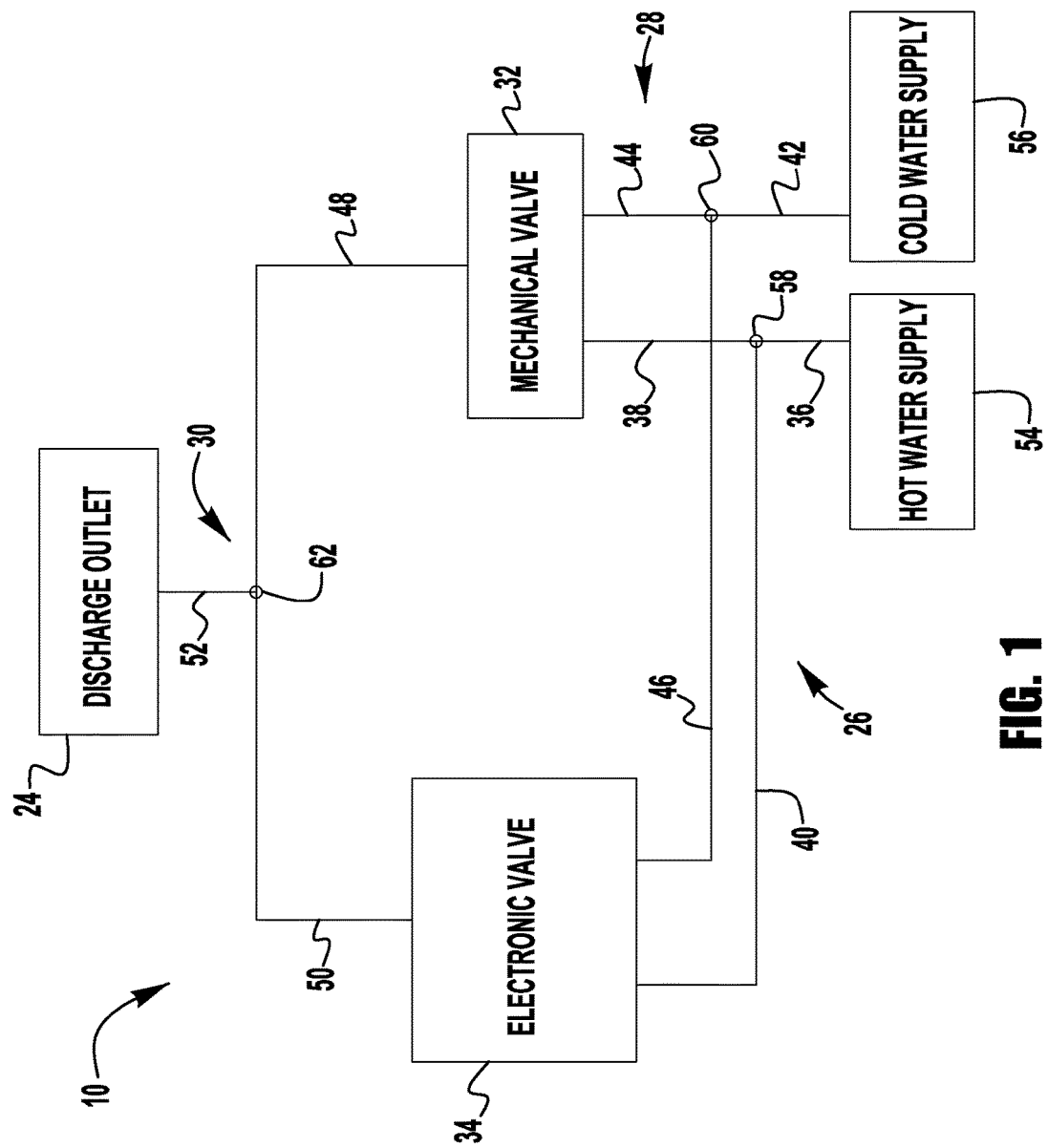
FIG. 1 is a schematic illustration of an electronic plumbing fixture fitting according to an exemplary embodiment of the present invention.

An exemplary embodiment of an electronic plumbing fixture fitting 10, such as an electronic faucet 12, is illustrated in FIG. 1. Exemplary embodiments of the electronic faucet 12 are illustrated in FIGS. 2-19.

Figure 3:
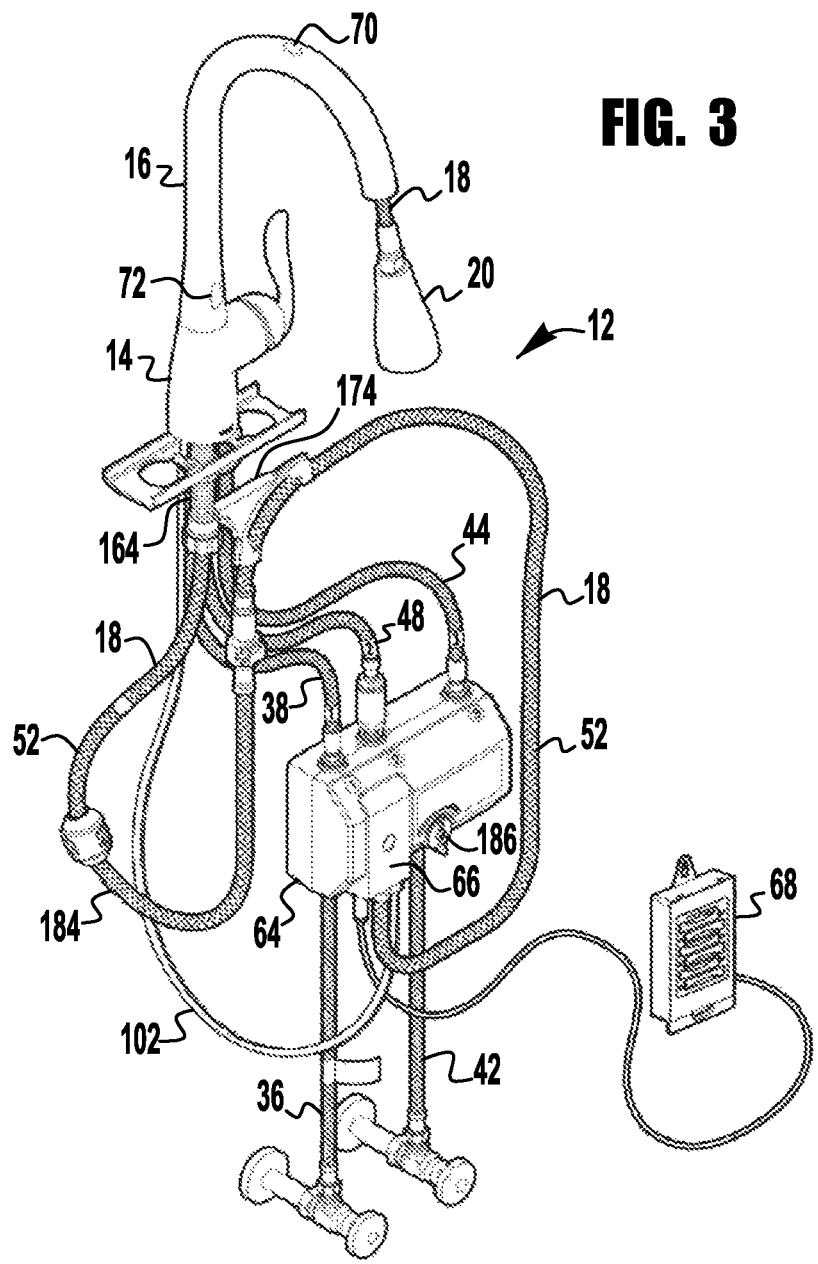
FIG. 3 is a perspective view of an electronic faucet with a toggle sensor and a presence sensor according to an exemplary embodiment of the present invention.

In the illustrated embodiments, as best shown in FIG. 3, the faucet 12 includes a hub 14, a spout 16, a wand hose 18, a wand 20, and a handle 22. An upstream end of the hub 14 is connected to a mounting surface (such as a counter or sink). An upstream end of the spout 16 is connected to a downstream end of the hub 14. The spout 16 is operable to rotate relative to the hub 14. The wand hose 18 extends through the hub 14 and the spout 16 and is operable to move within the hub 14 and the spout 16. An upstream end of the wand 20 is mounted in a downstream end of the spout 16 and is connected to a downstream end of the wand hose 18. A downstream end of the wand 20 includes a discharge outlet 24 through which water is delivered from the faucet 12. The wand 20 is operable to pull away from the spout 16. The handle 22 is connected to a side of the hub 14 and is operable to move relative to the hub 14. Although the faucet 12 has been described as having a rotatable spout 16, a pull-out or pull-down wand 20, and a handle 22 mounted on the hub 14, one of ordinary skill in the art will appreciate that, in certain embodiments, the spout 16 could be fixed relative to the hub 14, the faucet 12 may not include a wand 20, the handle 22 may be mounted on other locations on the faucet 12 or remote from the faucet 12, and/or the handle 22 may be any mechanical or other device that can be used to operate a mechanical valve.

Additionally, in the illustrated embodiments, as best shown in FIGS. 1 and 3, the fitting 10 includes a hot water line 26, a cold water line 28, a mixed water line 30, a mechanical valve 32, and an electronic valve 34. The hot water line 26 includes a common portion 36, a mechanical valve portion 38, and an electronic valve portion 40. The cold water line 28 includes a common portion 42, a mechanical valve portion 44, and an electronic valve portion

46. The mixed water line 30 includes a mechanical valve portion 48, an electronic valve portion 50, and a common portion 52.

An upstream end of the common portion 36 of the hot water line 26 connects to a hot water supply 54, and an upstream end of the common portion 42 of the cold water line 28 connects to a cold water supply 56. A downstream end of the common portion 36 of the hot water line 26 connects to a hot water tee 58, and a downstream end of the common portion 42 of the cold water line 28 connects to a cold water tee 60.

An upstream end of the mechanical valve portion 38 of the hot water line 26 connects to the hot water tee 58, and an upstream end of the mechanical valve portion 44 of the cold water line 28 connects to the cold water tee 60. A downstream end of the mechanical valve portion 38 of the hot water line 26 connects to the mechanical valve 32, and a downstream end of the mechanical valve portion 44 of the cold water line 28 connects to the mechanical valve 32.

An upstream end of the electronic valve portion 40 of the hot water line 26 connects to the hot water tee 58, and an upstream end of the electronic valve portion 46 of the cold water line 28 connects to the cold water tee 60. A downstream end of the electronic valve portion 40 of the hot water line 26 connects to the electronic valve 34, and a downstream end of the electronic valve portion 46 of the cold water line 28 connects to the electronic valve 34.

An upstream end of the mechanical valve portion 48 of the mixed water line 30 connects to the mechanical valve 32, and an upstream end of the electronic valve portion 50 of the mixed water line 30 connects to the electronic valve 34. A downstream end of the mechanical valve portion 48 of the mixed water line 30 connects to a mixed water tee 62, and a downstream end of the electronic valve portion 50 of the mixed water line 30 connects to the mixed water tee 62.

An upstream end of the common portion 52 of the mixed water line 30 connects to the mixed water tee 62. A downstream end of the common portion 52 of the mixed water line 30 connects to the discharge outlet 24.

In the illustrated embodiments, as best shown in FIGS. 1 and 3, the common portion 52 of the mixed water line 30 is the wand hose 18, and an upstream end of the wand hose 18 connects to the mixed water tee 62. As stated above, the downstream end of the wand hose 18 connects to the upstream end of the wand 20.

In the illustrated embodiments, each portion of the hot water line 26, the cold water line 28, and the mixed water line 30 includes one or more hoses. For example, the common portion 52 of the mixed water line 30 (also referred to as the wand hose 18) includes two hoses. However, one of ordinary skill in the art will appreciate that each portion of the hot water line 26, the cold water line 28, and the mixed water line 30 that includes one hose could include more than one hose, and each portion of the hot water line 26, the cold water line 28, and the mixed water line 30 that includes more than one hose could include one hose. In an exemplary embodiment, the hoses are flexible hoses. However, one of ordinary skill in the art will appreciate that other types of hoses could be used. If a portion of the hot water line 26, the cold water line 28, or the mixed water line 30 includes more than one hose, the hoses are connected via connectors. In an exemplary embodiment, the connectors are push-fit connectors. However, one of ordinary skill in the art will appreciate that other types of connectors could be used.

When reference is made to one component of the faucet 12 connecting to another component of the faucet 12, the connection may be direct or indirect. One of ordinary skill in the art will appreciate that additional components may be needed if the connection is indirect.

As described above, the mechanical valve 32 and the electronic valve 34 are in parallel. However, one of ordinary skill in the art will appreciate that, in certain embodiments, the mechanical valve 32 and the electronic valve 34 could be in series.

In an exemplary embodiment, the electronic valve 34 is a solenoid valve. However, one of ordinary skill in the art will appreciate that the electronic valve 34 could be any type of electronic valve, including, but not limited to, an electronic throttle or proportional valve and an electronic mixing valve.

As described above, the faucet 12 includes a mechanical valve 32 and an electronic valve 34. However, one of ordinary skill in the art will appreciate that the faucet 12 could include an electronic valve, without a mechanical valve. In an embodiment including an electronic valve without a mechanical valve, one of ordinary skill in the art will appreciate that the faucet 12 will not include other components related to the mechanical valve, such as a handle and water lines connected to the mechanical valve.

Figure 2:
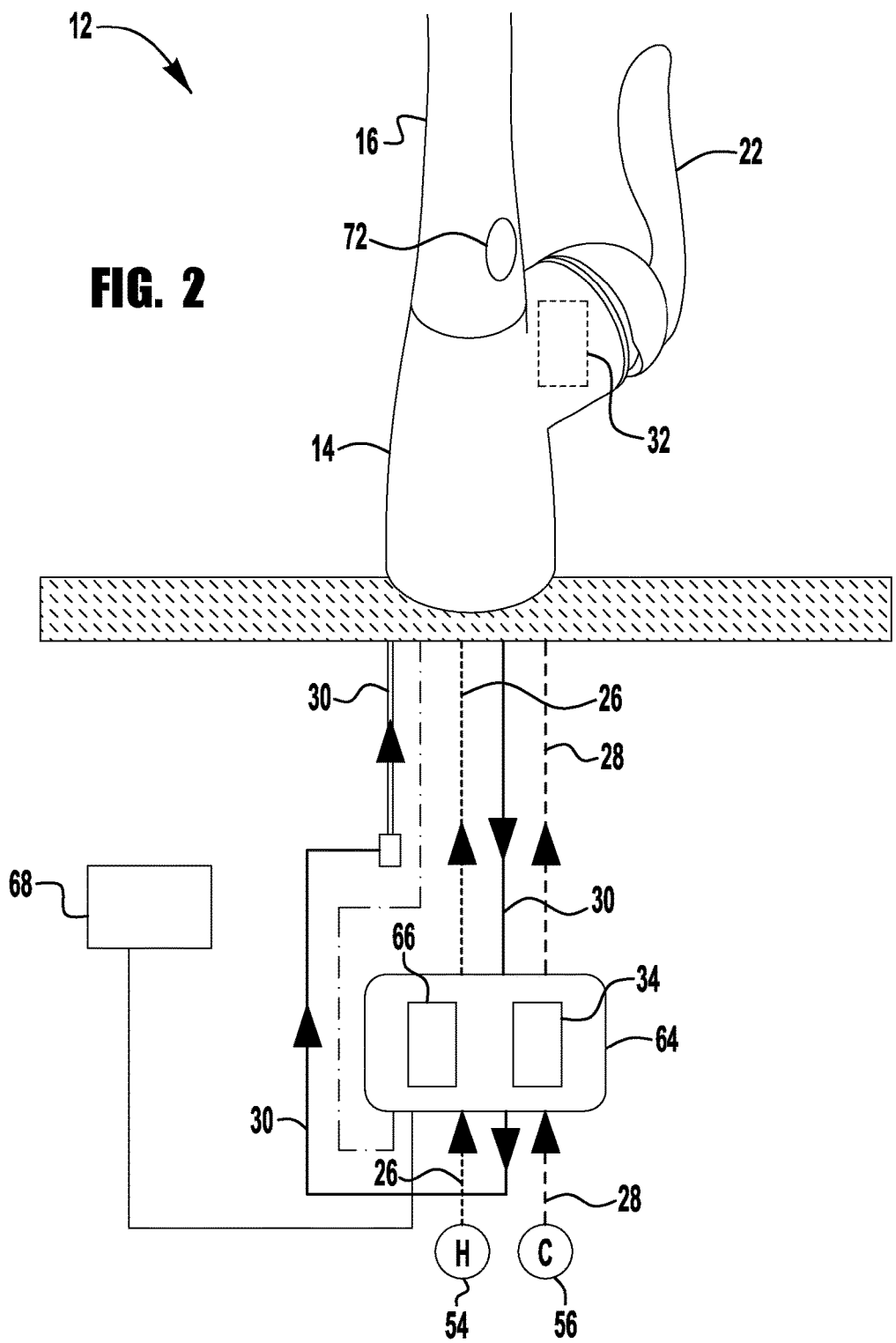
FIG. 2 is a schematic illustration of an electronic faucet according to an exemplary embodiment of the present invention.

In the illustrated embodiments, as best shown in FIGS. 2 and 3, the faucet 12 includes a flow module 64, an electronics module 66, and a power module 68. The flow module 64 and the electronics module 66 are further shown in FIGS. 10A-10D, 11, 12, and 13. The flow module 64 includes a number of inlets and outlets and a number of flow passages. These inlets/outlets and flow passages enable the easy management of the flow between the incoming supplies (i.e., the hot water supply 54 and the cold water supply 56) and the wand 20. The flow module 64 reduces the number of hoses required to implement the faucet 12 with the electronic valve 34 in parallel with the mechanical valve 32. The electronics module 66 includes a number of electronic components. These components enable the activation and deactivation of the electronic valve 34. In the illustrated embodiments, the electronics module 66 is connected to the flow module 64. The power module 68 provides electrical power to electronic components of the faucet 12.

Figure 4:
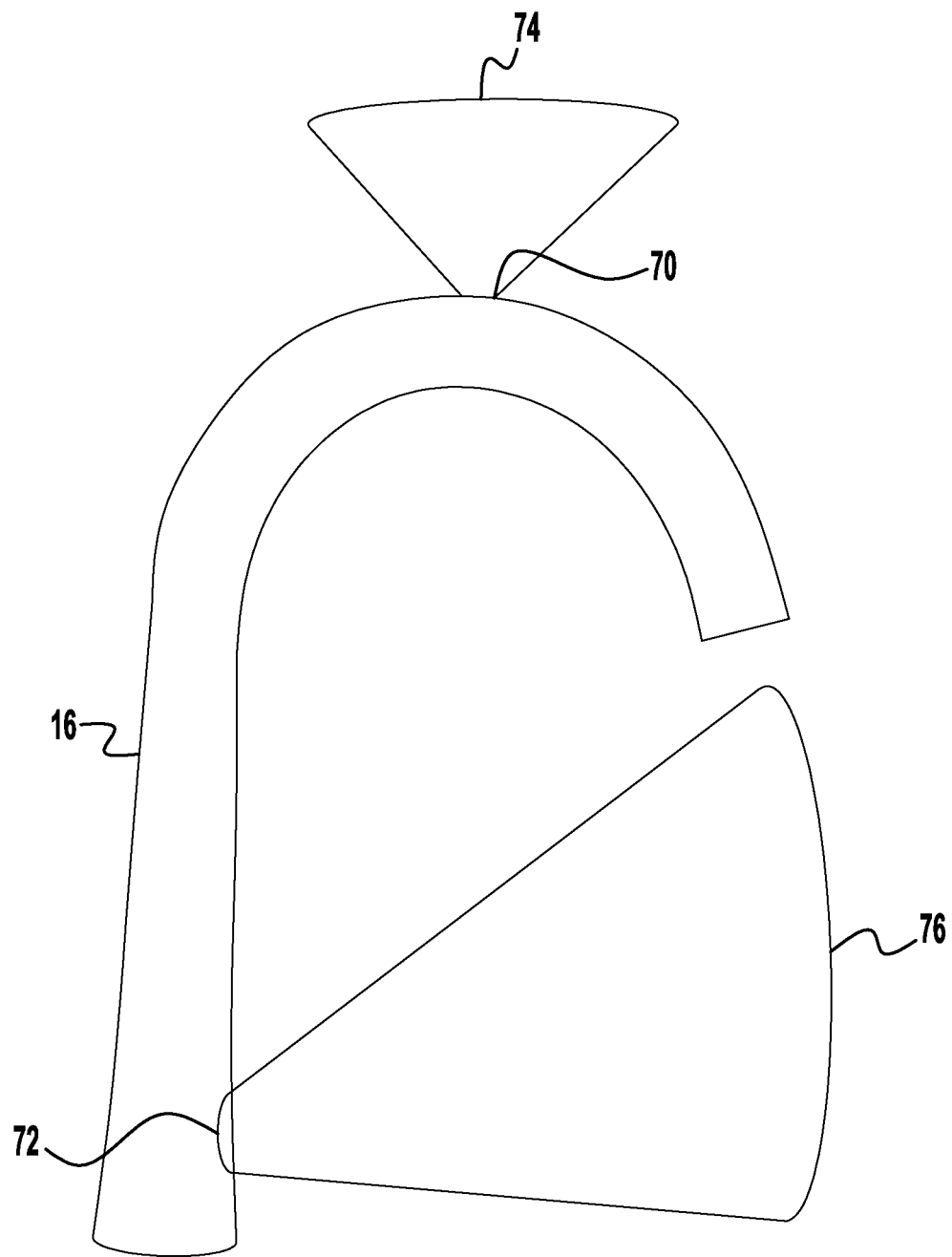
FIG. 4 is a right side elevational view of the electronic faucet of FIG. 3, including a toggle zone corresponding to the toggle sensor and a presence zone corresponding to the presence sensor.
Figure 6:
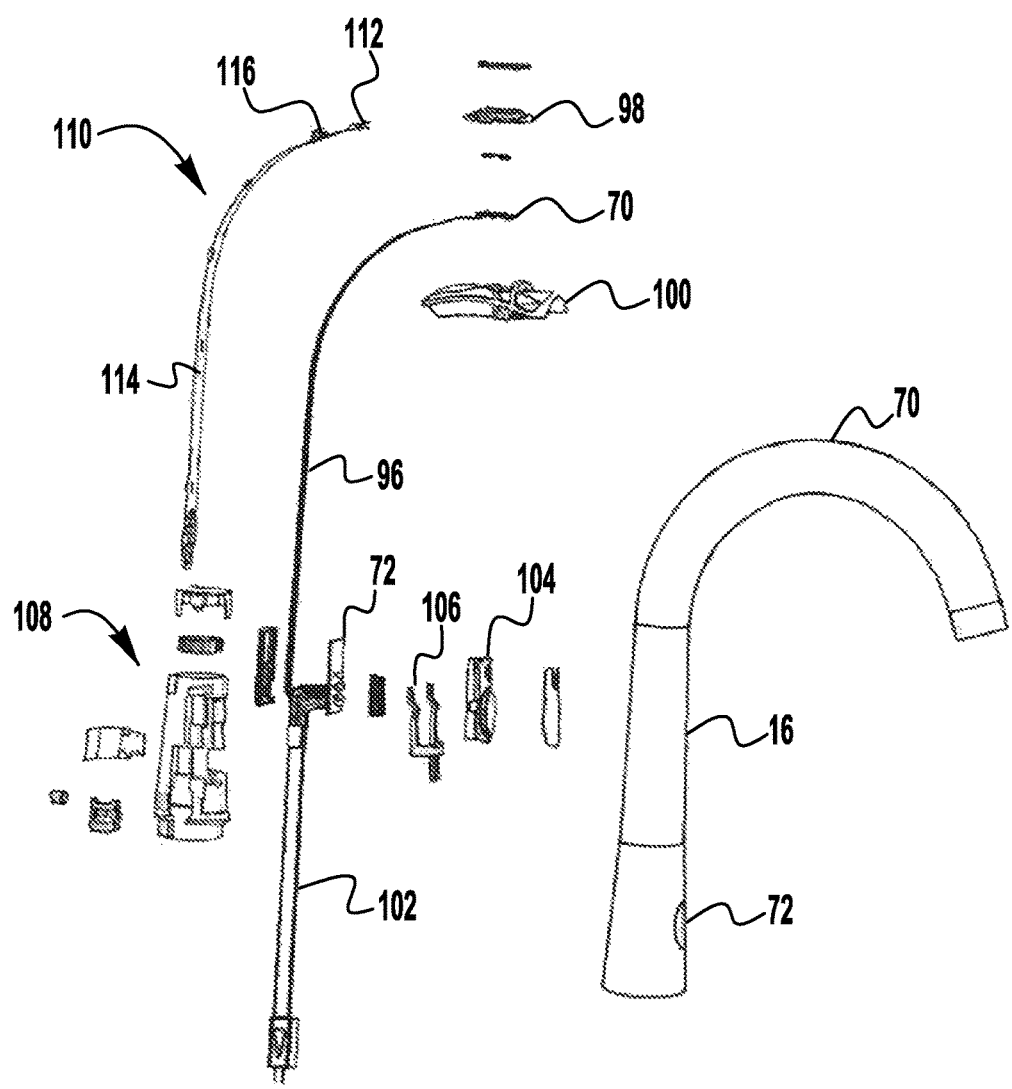
FIG. 6 is an exploded perspective view of certain components of the electronic faucet of FIG. 3, including certain sensor components.

Further, in the illustrated embodiments, as best shown in FIGS. 3, 4, and 6, the faucet 12 includes a toggle sensor 70 and a presence sensor 72.

In an exemplary embodiment, the toggle sensor 70 is a proximity sensor and, in particular, an infrared sensor. The toggle sensor 70 can also be referred to as a latching sensor or a sustained-flow sensor. In the illustrated embodiments, the toggle sensor 70 is mounted on an apex of the spout 16. The toggle sensor 70 defines a toggle zone 74, as best shown in FIG. 4. In an exemplary embodiment, the toggle sensor 70 is operable to activate the electronic valve 34 when an object enters the toggle zone 74 and to deactivate the electronic valve 34 when the object exits and reenters the toggle zone 74. As a result, once the electronic valve 34 is activated by a triggering of the toggle sensor 70, the electronic valve 34 remains activated until the toggle sensor 70 is next triggered. As used herein, an "object" can be any portion of a user's body or any item used by the user to trigger the toggle sensor 70. In the illustrated embodiments, the toggle zone 74 extends generally upwardly from the toggle sensor 70. Additionally, in the illustrated embodiments, the toggle zone 74 has a generally cone-like or fan-like shape.

In an exemplary embodiment, the presence sensor 72 is a proximity sensor, and, in particular, an infrared sensor. The presence sensor 72 can also be referred to as a quick-strike sensor. In the illustrated embodiments, the presence sensor 72 is mounted on the upstream end of the spout 16. In an alternative embodiment, the presence sensor 72 is mounted beneath the apex of the spout 16. The presence sensor 72 defines a presence zone 76, as best shown in FIG. 4. In an exemplary embodiment, the presence sensor 72 is operable to activate the electronic valve 34 when an object enters the presence zone 76 and to deactivate the electronic valve 34 when the object exits the presence zone 76. As a result, once the electronic valve 34 is activated by a triggering of the presence sensor 72, the electronic valve 34 only remains activated as long as the presence sensor 72 is continuously triggered. Again, as used herein, an "object" can be any portion of a user's body or any item used by the user to trigger the presence sensor 72. In the illustrated embodiments, the presence zone 76 extends generally horizontally from the presence sensor 72. In the alternative embodiment, the presence zone 76 extends generally downwardly from the presence sensor 72. Additionally, in the illustrated embodiments, the presence zone 76 has a generally cone-like or fan-like shape.

In an exemplary embodiment, the toggle zone 74 and the presence zone 76 are designed to prevent unintentional activation of the electronic valve 34. The toggle zone 74 and the presence zone 76 correspond to the user's expectations of where an object should be in order to trigger the toggle sensor 70 and the presence sensor 72.

In an exemplary embodiment, if the user desires to deactivate the toggle sensor 70 and/or the presence sensor 72 (e.g., to clean the faucet 12), the user takes a predetermined action above the mounting surface of the faucet 12 to indicate whether the user desires to deactivate the toggle sensor 70, the presence sensor 72, or both sensors. In a further exemplary embodiment, if the user desires to deactivate the toggle sensor 70 and/or the presence sensor 72, the user selectively covers the presence sensor 72 and/or the toggle sensor 70 for a predetermined period of time. In a still further exemplary embodiment, if the user desires to deactivate both the toggle sensor 70 and the presence sensor 72, the user covers the toggle sensor 70 for at least five seconds. However, one of ordinary skill in the art will appreciate that other actions could be taken to deactivate the toggle sensor 70 and/or the presence sensor 72.

As described above, the toggle sensor 70 and the presence sensor 72 are proximity sensors and, in particular, infrared sensors. Proximity sensors are sensors that detect the presence of an object without any physical contact. However, one of ordinary skill in the art will appreciate that the sensors could be any type of electronic sensors that can be triggered, including, but not limited to, other proximity sensors, touch sensors, and image sensors. Exemplary electronic sensors include, but are not limited to, electromagnetic radiation sensors (such as optical sensors and radar sensors), capacitance sensors, inductance sensors, piezo-electric sensors, and multi-pixel optical sensors (such as camera sensors). Moreover, the toggle sensor 70 and the presence sensor 72 may not be the same type of sensor. As further described above, the toggle sensor 70 is mounted on the apex of the spout 16 and the presence sensor 72 is mounted on the upstream end of the spout 16 or, alternatively, is mounted beneath the apex of the spout 16. However, one of ordinary skill in the art will appreciate that the sensors could be mounted in any location on the faucet 12 or in a location remote from the faucet 12. Furthermore, the toggle sensor 70 and the presence sensor 72 may be located in close proximity to each other or fairly remote from each other.

Similarly, as described above, the sensors are a toggle sensor 70 and a presence sensor 72. However, one of ordinary skill in the art will appreciate that the sensors could be any type of sensors that provide information useful in determining whether to activate or deactivate the mechanical valve 32 and/or the electronic valve 34, including, but not limited to, flow sensors, pressure sensors, temperature sensors, and position sensors. Moreover, the toggle sensor 70 and the presence sensor 72 may be the same type of sensor.

The toggle sensor 70 has a control associated with it. Similarly, the presence sensor 72 has a control associated with it. The controls for the toggle sensor 70 and the presence sensor 72 receive signals from the sensors and send signals to other components of the faucet 12 in response to the signals received from the sensors. Each control includes a control program and control data. During operation, the control program receives the signals from the sensors and sends the signals to the electronic valve 34 or other electronic components of the faucet 12 to control operation of the components of the faucet 12. For example, the control program will receive a signal from the presence sensor 72 when an object enters the presence zone 76. In response to this signal, the control program will send a signal to activate the electronic valve 34. In an exemplary embodiment, the control data includes calibration constants.

The control program is not unique to each individual sensor. Generally, the same control program is used for all sensors of a specific embodiment that are manufactured at the same time. However, the control data is unique to each individual sensor. The controls for the sensors need to be calibrated. A first calibration occurs during manufacture and/or assembly and accounts for differences between components of individual sensors. A second calibration occurs after installation and accounts for differences in the environment of the sensors. Since the calibrations account for differences between individual sensors and their environments, the calibrations result in control data that is unique for each individual sensor.

In an exemplary embodiment, the control for the toggle sensor 70 is stored in more than one location. Similarly, the control for the presence sensor 72 is stored in more than one location.

Figure 5:
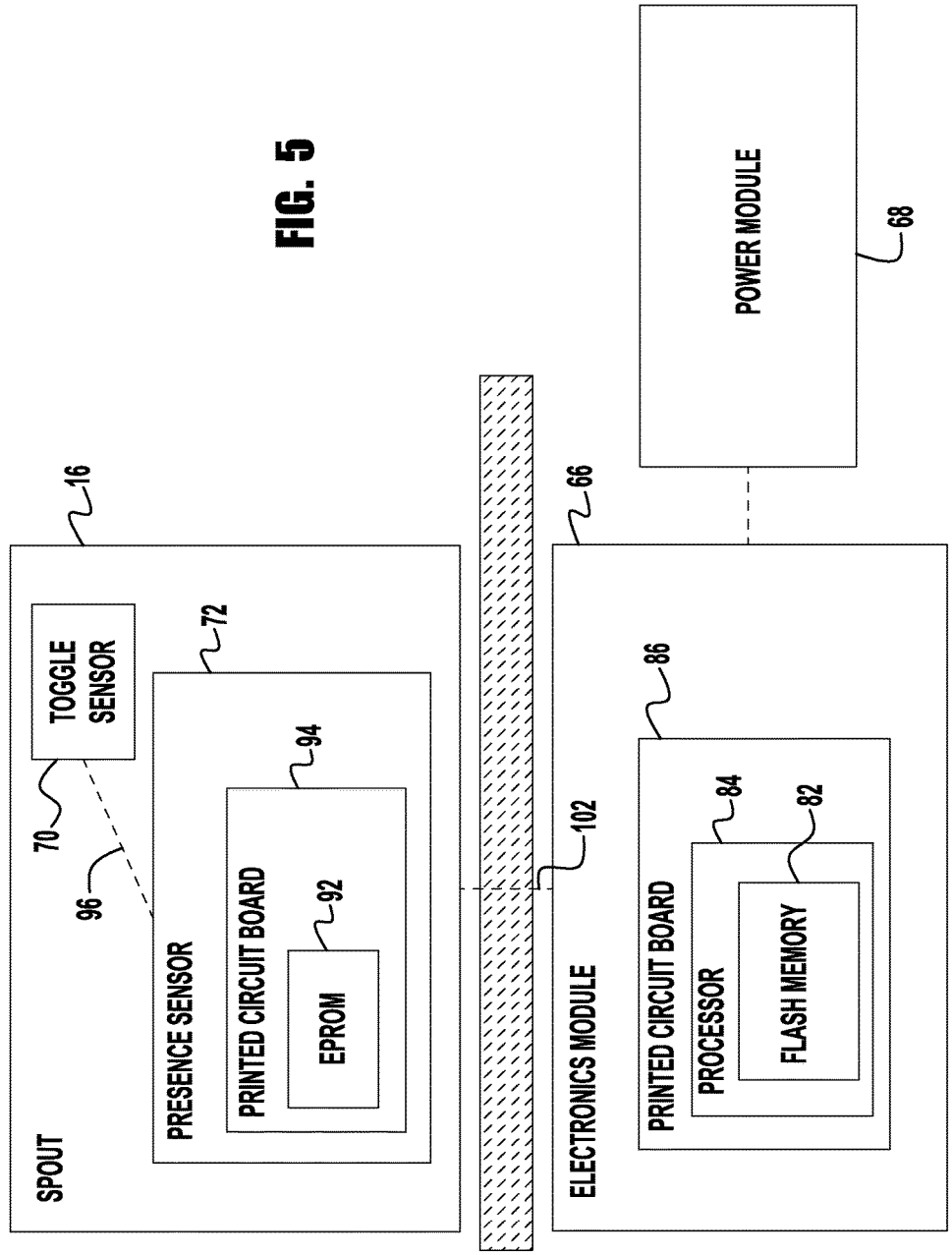
FIG. 5 is a schematic illustration of certain components of the electronic faucet of FIG. 3, including certain electronic components.

In an exemplary embodiment, the control program 78 for the toggle sensor 70 and the control program 80 for the presence sensor 72 are stored outside the portion of the faucet 12 that houses the sensors. In a further exemplary embodiment, the control program 78 for the toggle sensor 70 and the control program 80 for the presence sensor 72 are stored in the electronics module 66. In a still further exemplary embodiment, the control program 78 for the toggle sensor 70 and the control program 80 for the presence sensor 72 are stored in data storage (such as flash memory 82 in a processor 84 on a printed circuit board 86, as best shown in FIG. 5) in the electronics module 66.

In an exemplary embodiment, the control data 88 for the toggle sensor 70 and the control data 90 for the presence sensor 72 are stored inside the portion of the faucet 12 that houses the sensors. In a further exemplary embodiment, the control data 88 for the toggle sensor 70 and the control data 90 for the presence sensor 72 are stored inside the spout 16. In a still further exemplary embodiment, the control data 88 for the toggle sensor 70 and the control data 90 for the presence sensor 72 are stored inside the upstream end of the spout 16. In a still further exemplary embodiment, the control data 88 for the toggle sensor 70 and the control data 90 for the presence sensor 72 are stored in data storage (such as an EPROM 92 on a printed circuit board 94, as best shown in FIG. 5) in the presence sensor 72.

As a result, the portions of the controls that are not unique to the sensors are stored separate from the portions of the controls that are unique to the sensors. In the exemplary embodiments, the portions of the controls that are not unique to the sensors are stored outside the portion of the faucet 12 that houses the sensors and, in particular, in the electronics module 66 and, further in particular, in the data storage in the electronics module 66. Additionally, the portions of the controls that are unique to the sensors are stored inside the portion of the faucet 12 that houses the sensors and, in particular, inside the spout 16 and, further in particular, in or near the presence sensor 72 inside the upstream end of the spout 16 and, further in particular, in the data storage in the presence sensor 72. Although the controls have been described in specific exemplary locations, one of ordinary skill in the art will appreciate that the controls could be in other locations so long as the portions of the controls that are not unique to the sensors are stored separate from the portions of the controls that are unique to the sensors.

Due to the separation of the controls for the toggle sensor 70 and the presence sensor 72, the operation of the toggle sensor 70 and the presence sensor 72 is not linked to the operation of the electronics module 66. As a result, these components can be separately manufactured, assembled, installed, and calibrated. Moreover, if any of these components fails, all of the components do not need to be replaced. The failed component can be replaced without affecting the operation of the remaining components.

Due to the separation of the controls for the toggle sensor 70 and the presence sensor 72, the size of the spout 16 can be significantly reduced. In an exemplary embodiment, the size of the spout 16 is no larger than the size of spouts for typical non-electronic faucets having similar designs. In a further exemplary embodiment, an inner diameter of the spout 16 is less than or equal to one inch. A reduction in the size of the spout 16 enables greater design options for the faucet 12.

In the illustrated embodiments, the toggle sensor 70 is electrically connected to the presence sensor 72. More specifically, a communications/power cable 96 connects the toggle sensor 70 to the presence sensor 72, as best shown in FIGS. 5 and 6. Additionally, in the illustrated embodiments, the toggle sensor 70 has mounting structure associated with it. More specifically, the toggle sensor 70 has a window 98 and a retainer 100 that maintain the toggle sensor 70 in position on the apex of the spout 16.

In the illustrated embodiments, the presence sensor 72 is electrically connected to the electronics module 66. More specifically, a communications/power cable 102 connects the presence sensor 72 to the electronics module 66, as best shown in FIGS. 3, 5, and 6. Additionally, in the illustrated embodiments, the presence sensor 72 has mounting structure associated with it. More specifically, the presence sensor 72 has a window 104, a clip 106, and a housing 108 that maintain the presence sensor 72 on the upstream end of the spout 16.

As described above, the toggle sensor 70 is connected to the presence sensor 72 via the communications/power cable 96, and the presence sensor 72 is connected to the electronics module 66 via communications/power cable 102. However, one of ordinary skill in the art will appreciate that, in certain embodiments, one or more of these connections could be wireless.

Figure 7:
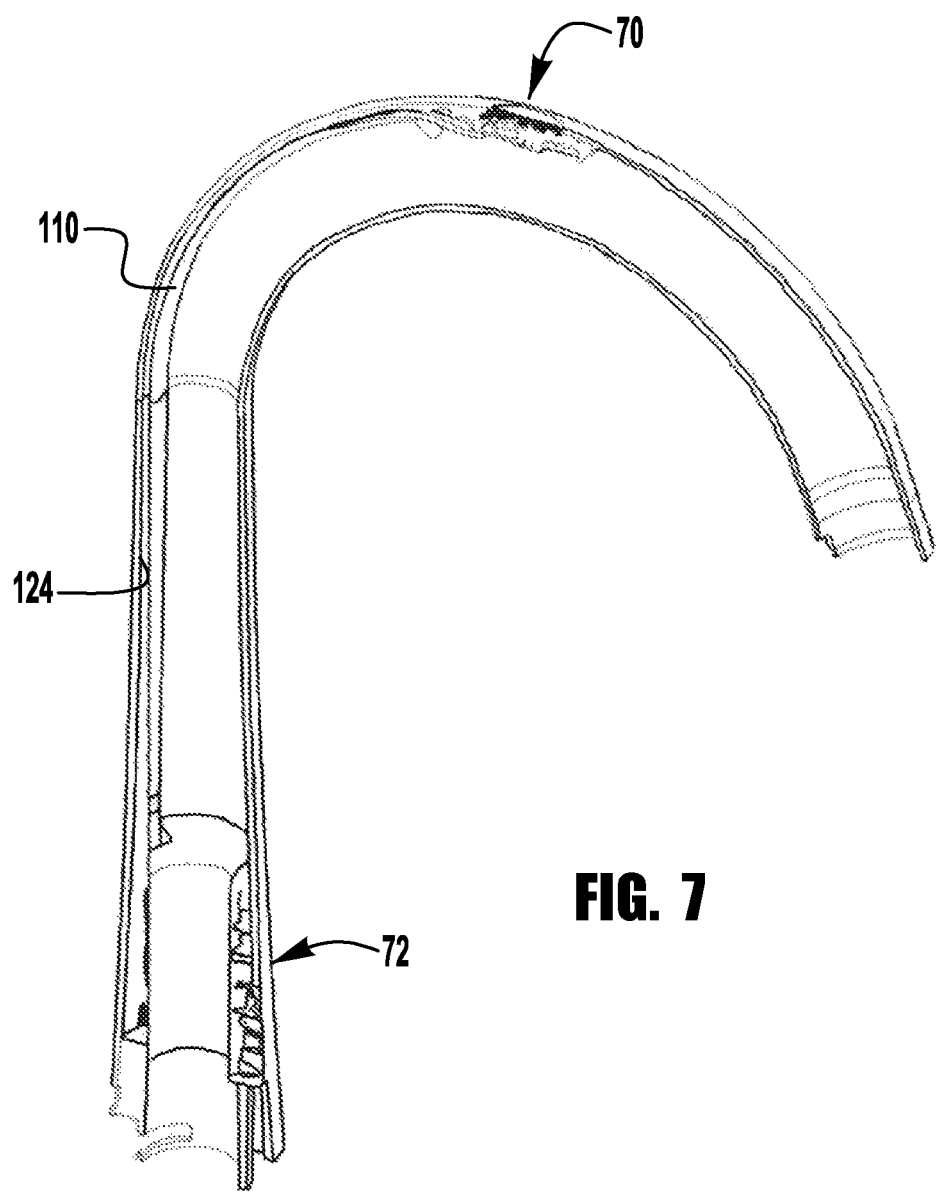
FIG. 7 is a perspective view of the electronic faucet of FIG. 6, with the sensor components assembled and installed in the electronic faucet.

In the illustrated embodiments, as best shown in FIGS. 6, 7, and 8, the faucet 12 includes a cable protector 110. The cable protector 110 generally extends between the toggle sensor 70 and the presence sensor 72. The cable protector 110 includes an insertion portion 112, a barrier portion 114, and an alignment feature 116.

The insertion portion 112 is connected to the toggle sensor 70. In the illustrated embodiments, the insertion portion 112 includes gripping members 118 that enable the insertion portion 112 to connect to the toggle sensor 70. Once the gripping members 118 are connected to the toggle sensor 70, insertion of the cable protector 110 into the spout 16 results in insertion of the toggle sensor 70 into the spout 16.

The barrier portion 114 extends along a substantial portion of a length of the communications/power cable 96. In the illustrated embodiments, the barrier portion 114 includes a generally flat elongated member 120 that enables the barrier portion 114 to shield the communications/power cable 96 from other components in the spout 16, such as the wand hose 18. As the wand 20 is pulled away from the spout 16 and causes the wand hose 18 to move through the spout 16, the cable protector 110 prevents the wand hose 18 from contacting and, possibly, damaging the communications/power cable 96.

The alignment feature 116 positions the communications/power cable 96 along the barrier portion 114 of the cable protector 110. In the illustrated embodiments, the alignment feature 116 includes opposing tabs 122 projecting from the barrier portion 114 that enable the alignment feature 116 to maintain the communications/power cable 96 in position against the barrier portion 114.

Once the cable protector 110 is inserted into the spout 16, the communications/power cable 96 extends along a rear inner surface 124 of the spout 16. In an exemplary embodiment, the cable protector 110 is made of a semi-rigid material.

Figure 9:
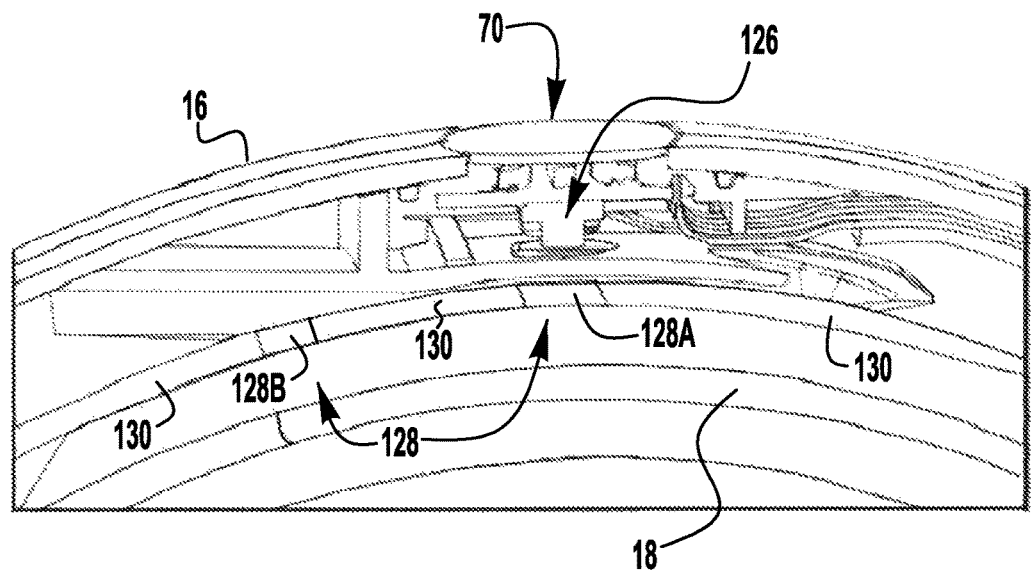
FIG. 9 is a cross-sectional view of certain components of the electronic faucet of FIG. 3, including the toggle sensor and a hose sensor.
Figure 10B:
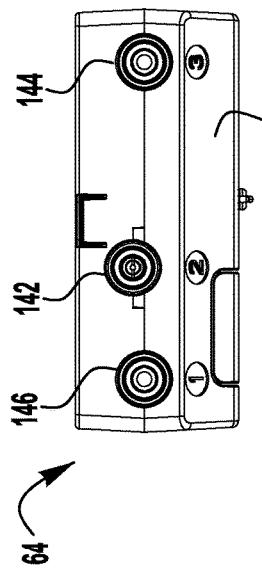
FIGS. 10A-10D are views of a flow module and an electronics module of the electronic faucet of FIG. 3
Figure 10C:
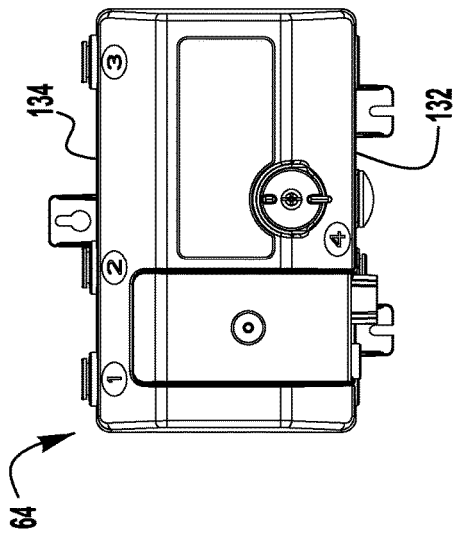
Figure 10D:
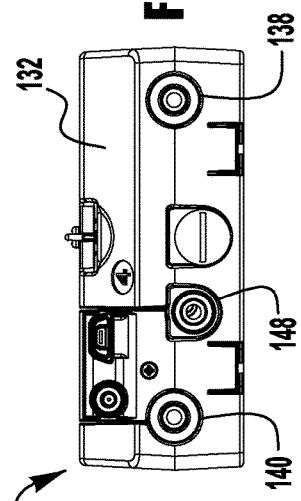
Figure 10A:
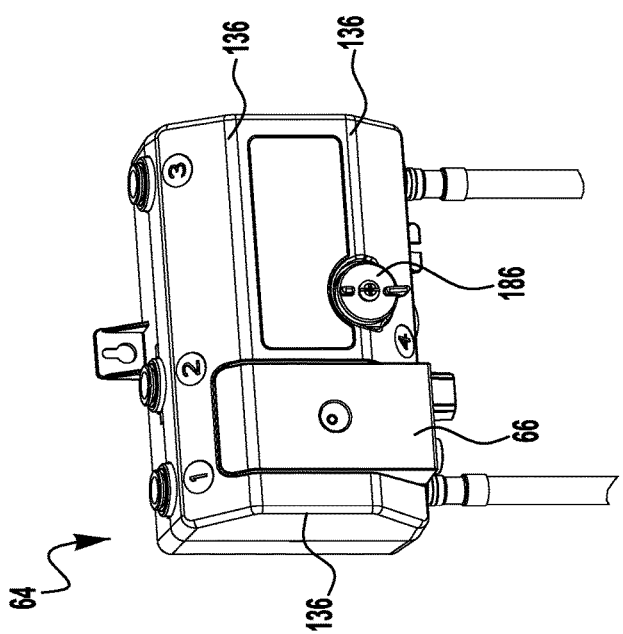
Figure 12:
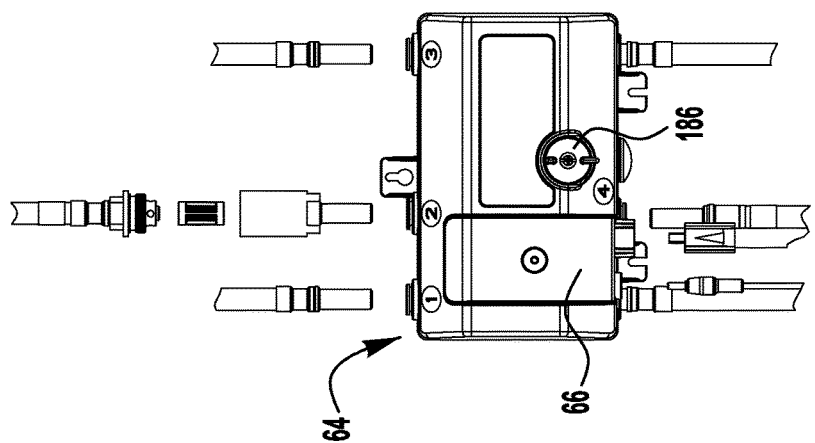
FIG. 12 is a front elevational view of the flow module and the electronics module of FIG. 11, with the electronics module connected to the flow module.
Figure 11:
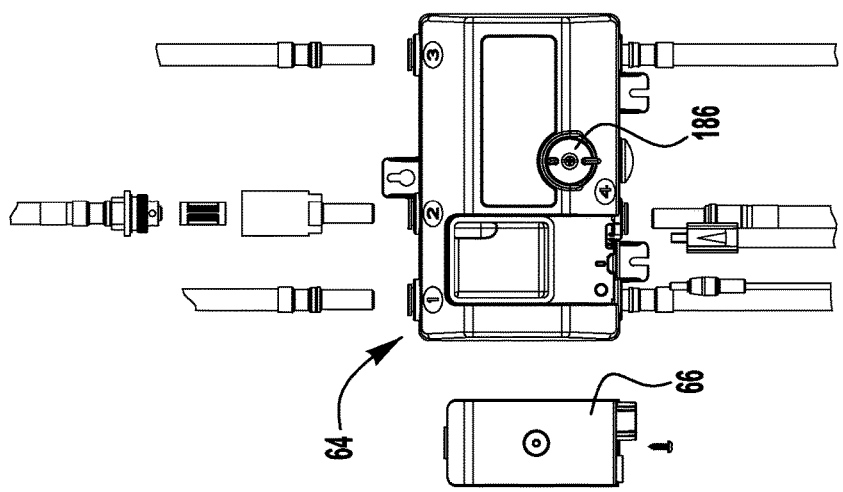
FIG. 11 is a front elevational view of the flow module and the electronics module of FIGS. 10A-10D, with the electronics module separate from the flow module.
Figure 13:
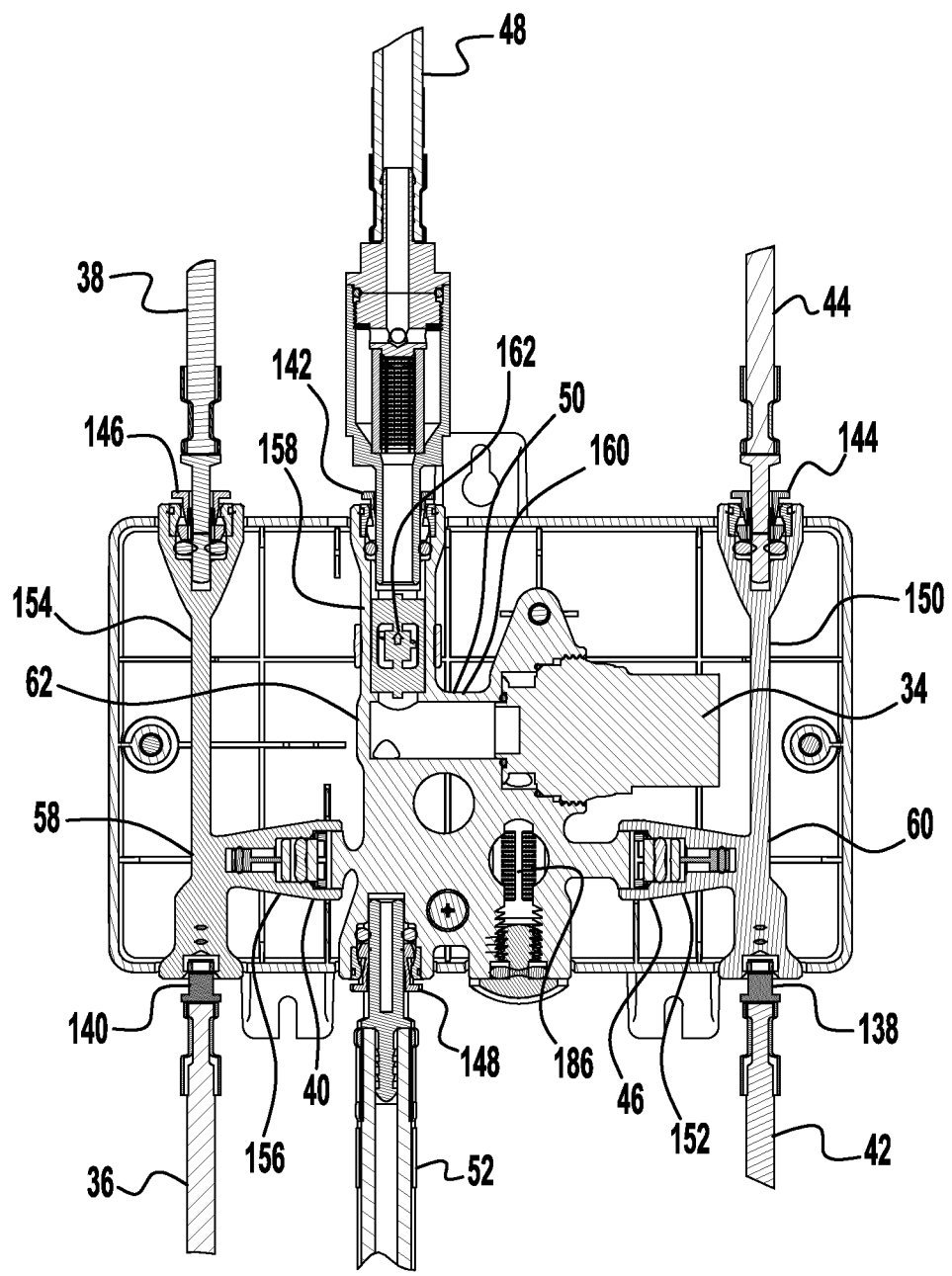
FIG. 13 is a cross-sectional view of the flow module of FIGS. 11 and 12.

In the illustrated embodiments, as best shown in FIG. 9, the faucet 12 includes a hose sensor 126. In an exemplary embodiment, the hose sensor 126 is a proximity sensor and, in particular, an infrared sensor. However, one of ordinary skill in the art will appreciate that the hose sensor 126 could be any type of sensor that can be triggered, as discussed above with regard to the toggle sensor 70 and the presence sensor 72. In the illustrated embodiments, the hose sensor 126 is mounted beneath the toggle sensor 70. However, one of ordinary skill in the art will appreciate that the hose sensor 126 could be mounted in any location along the spout 16. The hose sensor 126 is directed toward the wand hose 18 inside the spout 16. In an exemplary embodiment, the hose sensor 126 is operable to determine when the wand hose 18 is moved through the spout 16 and to send a signal indicating when the wand hose 18 is moved through the spout 16.

In the illustrated embodiments, the wand hose 18 includes a marked portion 128 and an unmarked portion 130. The marked portion 128 can include any marking that enables the hose sensor 126 to distinguish the marked portion 128 from the unmarked portion 130. In an exemplary embodiment, the marked portion 128 is separately formed from the wand hose 18 and then connected to the wand hose 18. In an exemplary embodiment, the marked portion 128 is integrally formed with the wand hose 18. In an exemplary embodiment, the marked portion 128 has a different reflective property than the unmarked portion 130. The hose sensor 126 is operable to determine when the wand hose 18 is moved through the spout 16.

When the wand hose 18 has not been moved through the spout 16, the marked portion 128 is adjacent to (i.e., below) the hose sensor 126. In this position, the hose sensor 126 detects the marked portion 128 and determines that the wand hose 18 has not been moved through the spout 16. When the wand hose 18 has been moved through the spout 16, the marked portion 128 is no longer adjacent to (i.e., below) the hose sensor 126. In this position, the hose sensor 126 does not detect the marked portion 128 and determines that the wand hose 18 has been moved through the spout 16.

In the illustrated embodiments, the wand hose 18 includes a plurality of marked portions 128. Again, the marked portions 128 can include any marking that enables the hose sensor 126 to distinguish the marked portions 128 from the unmarked portion 130 and each marked portion 128 from the other marked portions 128. In an exemplary embodiment, the marked portions 128 are separately formed from the wand hose 18 and then connected to the wand hose 18. In an exemplary embodiment, the marked portions 128 are integrally formed with the wand hose 18. In an exemplary embodiment, each marked portion 128 has a different reflective property than the unmarked portion 130 and each marked portion 128 has a different reflective property than the other marked portions 128. The hose sensor 126 is operable to determine when the wand hose 18 is moved through the spout 16 and how far the wand hose 18 has been moved through the spout 16.

When the wand hose 18 has not been moved through the spout 16, a first marked portion 128A is adjacent to (i.e., below) the hose sensor 126. In this position, the hose sensor 126 detects the first marked portion 128A and determines that the wand hose 18 has not been moved through the spout 16. When the wand hose 18 has been moved through the spout 16, the first marked portion 128A is no longer adjacent to (i.e., below) the hose sensor 126 and a second marked portion 128B or a subsequent marked portion is adjacent to (i.e., below) the hose sensor 126. In this position, the hose sensor 126 does not detect the first marked portion 128A and determines that the wand hose 18 has been moved through the spout 16. Additionally, in this position, the hose sensor 126 detects the second marked portion 128B or the subsequent marked portion and determines how far the wand hose 18 has been moved through the spout 16 based on which marked portion 128 the hose sensor 126 detects.

Since the hose sensor 126 determines when and how far the wand hose 18 has been moved through the spout 16 (i.e., extended out of the spout 16 or refracted into the spout 16), the hose sensor 126 can be used to control operation of other components of the faucet 12. For example, when the hose sensor 126 determines that the wand hose 18 has been moved through the spout 16, a signal can be sent to activate or deactivate the electronic valve 34. Additionally, when the hose sensor 126 determines that the wand hose 18 has been moved through the spout 16, a signal can be sent to activate or deactivate the toggle sensor 70 and/or the position sensor. Further, when the hose sensor 126 determines that the wand hose 18 has been moved through the spout 16, a signal can be sent to change a hierarchy that governs operation of the toggle sensor 70 and the presence sensor 72.

In the illustrated embodiments, as best shown in FIG. 3, the flow module 64 is operable to mount below the mounting surface (such as the counter or sink). The mechanical valve 32 is located outside the flow module 64, and the electronic valve 34 is located inside the flow module 64. In the illustrated embodiments, as best shown in FIGS. 10A-10D, 11, and 12, the flow module 64 includes a first side 132 and a second side 134. The first side 132 is opposite the second side 134. Edges 136 of the flow module 64 are chamfered so that the water lines/hoses do not catch on the edges 136.

In the illustrated embodiments, as best shown in FIGS. 1, 3, 10A-10D, and 13, the flow module 64 includes the following inlets:

1. a cold water inlet 138 operable to receive cold water from the cold water supply 56—as illustrated, the cold water inlet 138 fluidly connects to the common portion 42 of the cold water line 28, 2. a hot water inlet 140 operable to receive hot water from the hot water supply 54—as illustrated, the hot water inlet 140 fluidly connects to the common portion 36 of the hot water line 26, and 3. a mixed water inlet 142 operable to receive mixed water from the mechanical valve 32—as illustrated, the mixed water inlet 142 fluidly connects to the mechanical valve portion 48 of the mixed water line 30.

In the illustrated embodiments, as best shown in FIGS. 1, 3, 10A-10D, and 13, the flow module 64 includes the following outlets:

1. a cold water outlet 144 operable to discharge cold water to the mechanical valve 32—as illustrated, the cold water outlet 144 fluidly connects to the mechanical valve portion 44 of the cold water line 28, 2. a hot water outlet 146 operable to discharge hot water to the mechanical valve 32—as illustrated, the hot water outlet 146 fluidly connects to the mechanical valve portion 38 of the hot water line 26, and 3. a mixed water outlet 148 operable to discharge mixed water from the mechanical valve 32 or the electronic valve 34 to the discharge outlet 24—as illustrated, the mixed water outlet 148 fluidly connects to the common portion 52 of the mixed water line 30 (also referred to as the wand hose 18).

In the illustrated embodiments, the cold water inlet 138, the hot water inlet 140, and the mixed water outlet 148 are in the first side 132 of the flow module 64. Additionally, the cold water outlet 144, the hot water outlet 146, and the mixed water inlet 142 are in the second side 134 of the flow module 64.

In the illustrated embodiments, as best shown in FIGS. 1, 3, 10A-10D, and 13, the flow module 64 includes the following flow passages:

1. a first cold water passage 150 operable to fluidly connect the cold water inlet 138 and the cold water outlet 144—as illustrated, the first cold water passage 150 includes a portion of the common portion 42 of the cold water line 28, the cold water tee 60, and a portion of the mechanical valve portion 44 of the cold water line 28, 2. a second cold water passage 152 operable to fluidly connect the cold water inlet 138 and the electronic valve 34—as illustrated, the second cold water passage 152 includes a portion of the common portion 42 of the cold water line 28, the cold water tee 60, and the electronic valve portion 46 of the cold water line 28—as illustrated, a portion of the first cold water passage 150 is common with a portion of the second cold water passage 152, 3. a first hot water passage 154 operable to fluidly connect the hot water inlet 140 and the hot water outlet 146—as illustrated, the first hot water passage 154 includes a portion of the common portion 36 of the hot water line 26, the hot water tee 58, and a portion of the mechanical valve portion 38 of the hot water line 26, 4. a second hot water passage 156 operable to fluidly connect the hot water inlet 140 and the electronic valve 34—as illustrated, the second hot water passage 156 includes a portion of the common portion 36 of the hot water line 26, the hot water tee 58, and the electronic valve portion 40 of the hot water line 26—as illustrated, a portion of the first hot water passage 154 is common with a portion of the second hot water passage 156, 5. a first mixed water passage 158 operable to fluidly connect the mixed water inlet 142 and the mixed water outlet 148—as illustrated, the first mixed water passage 158 includes a portion of the mechanical valve portion 48 of the mixed water line 30, the mixed water tee 62, and a portion of the electronic valve portion 50 of the mixed water line 30, and 6. a second mixed water passage 160 operable to fluidly connect the electronic valve 34 and the mixed water outlet 148—as illustrated, the second mixed water passage 160 includes the electronic valve portion 50 of the mixed water line 30, the mixed water tee 62, and a portion of the common portion 52 of the mixed water line 30—as illustrated, a portion of the first mixed water passage 158 is common with a portion of the second mixed water passage 160.

In the illustrated embodiments, the first mixed water passage 158 includes a flow sensor 162. The flow sensor 162 detects whether the mechanical valve 32 is activated. In an exemplary embodiment, the flow sensor 162 is a turbine sensor. The use of a turbine sensor enables the hydraulics module to be mounted horizontally or vertically. However, one of ordinary skill in the art will appreciate that, in certain embodiments, other types of sensors could be used to determine whether the mechanical valve 32 is activated, including, but not limited to, pressure sensors and position sensors.

In the illustrated embodiments, as best shown in FIGS. 3, 17, 18, and 19, the faucet 12 includes a mounting shank 164. The mounting shank 164 extends downwardly from the hub 14. The mounting shank 164 extends through and below the mounting surface (such as the counter or sink). The mounting shank 164 has a hollow interior 166. The mounting shank 164 has a threaded exterior 168. The mounting shank 164 has an inlet 170 and an outlet 172. The outlet 172 of the mounting shank 164 extends into the hub 14.

Figure 14:
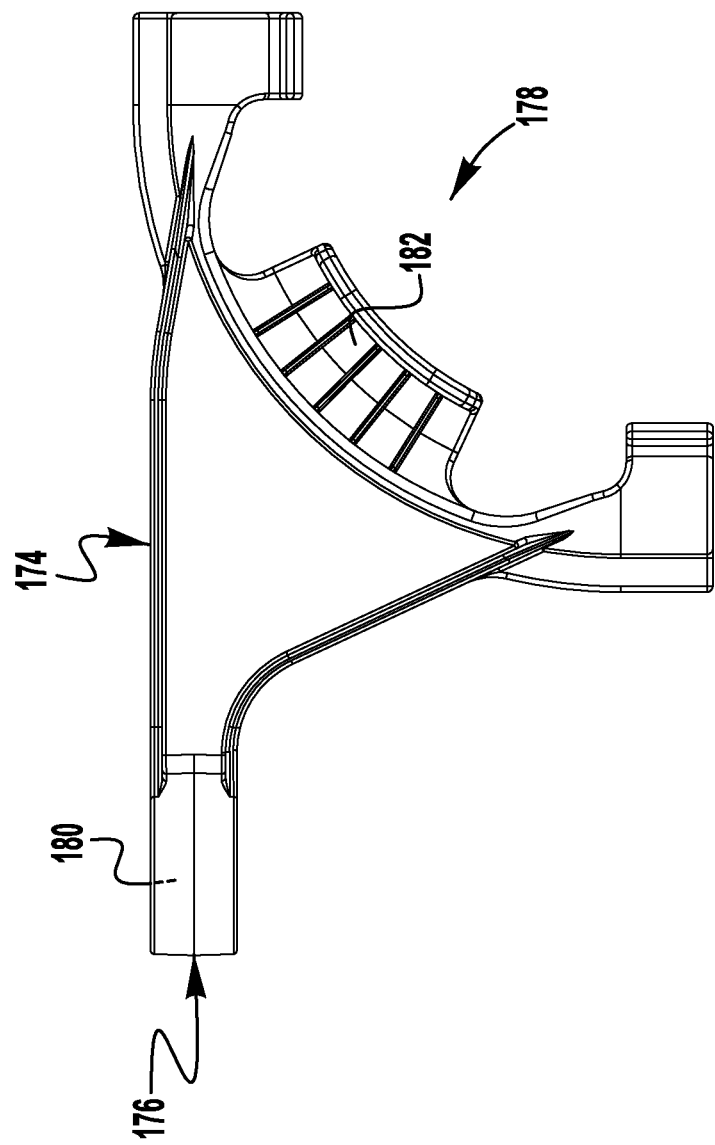
FIG. 14 is a front elevational view of a hose bracket of the electronic faucet of FIG. 3.
Figure 16:
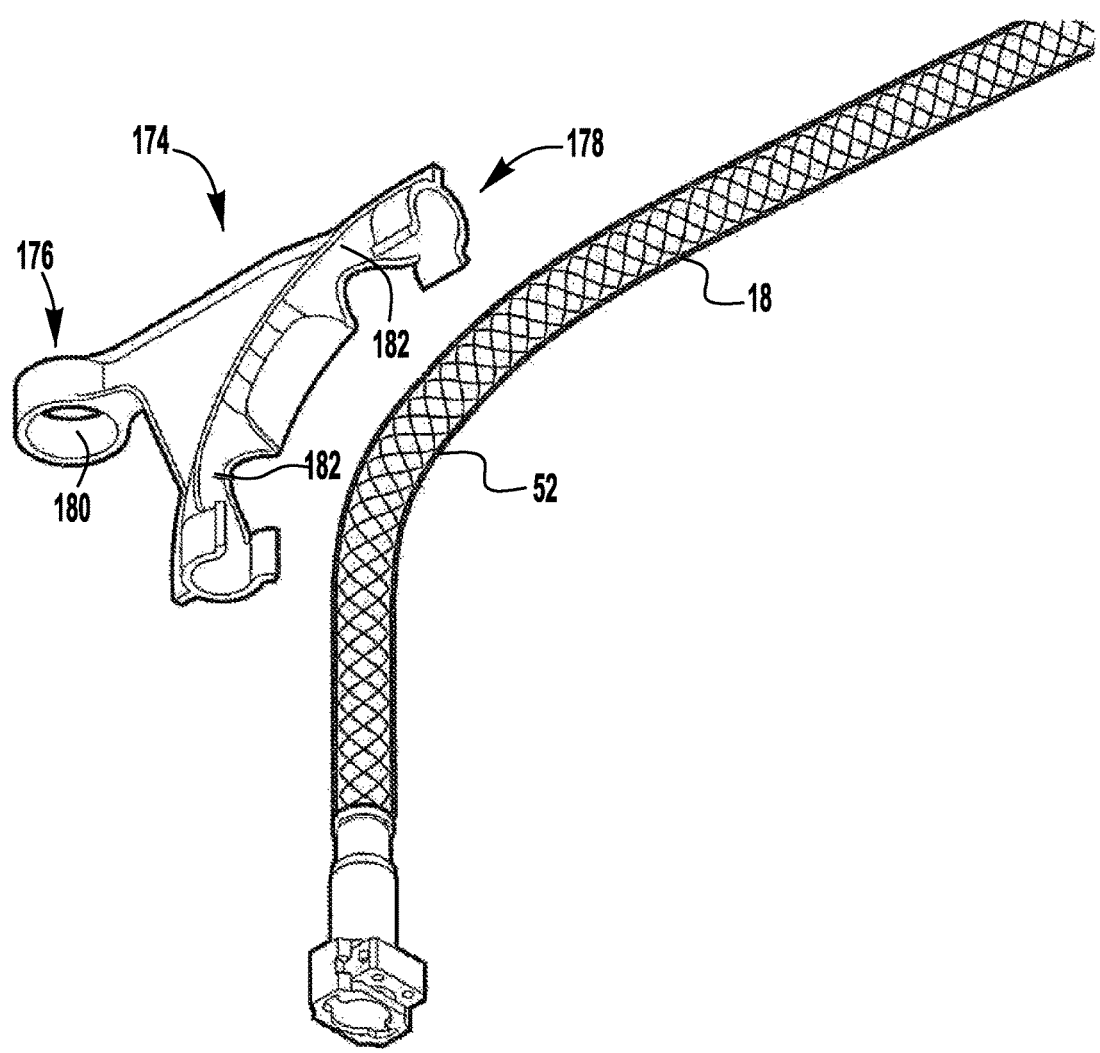
FIG. 16 is a perspective view of the hose bracket of FIG. 14 before being connected to a flexible hose.

In the illustrated embodiments, as best shown in FIGS. 3, 14, and 16, the faucet 12 includes a hose bracket 174. The hose bracket 174 includes a mounting portion 176 and a guide portion 178. The mounting portion 176 is connected to the mounting shank 164. More specifically, the mounting portion 176 includes a threaded bore 180 that enables the mounting portion 176 to thread onto the mounting shank 164. The guide portion 178 is connected to the wand hose 18 that delivers water from the flow module 64 to the wand 20 (also referred to as the common portion 52 of the mixed water line 30). More specifically, the guide portion 178 includes a curved channel 182 that enables the guide portion 178 to clamp onto the wand hose 18.

The hose bracket 174 positions the wand hose 18 between the mixed water outlet 148 and the inlet of the mounting shank 164 such that a portion of the wand hose 18 extends in a loop 184 between the hose bracket 174 and the inlet of the mounting shank 164. As a result, the hose bracket 174 ensures that the wand hose 18 is properly aligned relative to the hub 14 and the spout 16 through which the wand hose 18 extends and moves. When the wand hose 18 is properly aligned relative to the hub 14 and the spout 16, the wand 20 can be easily pulled away from and returned to the spout 16.

Figure 15:
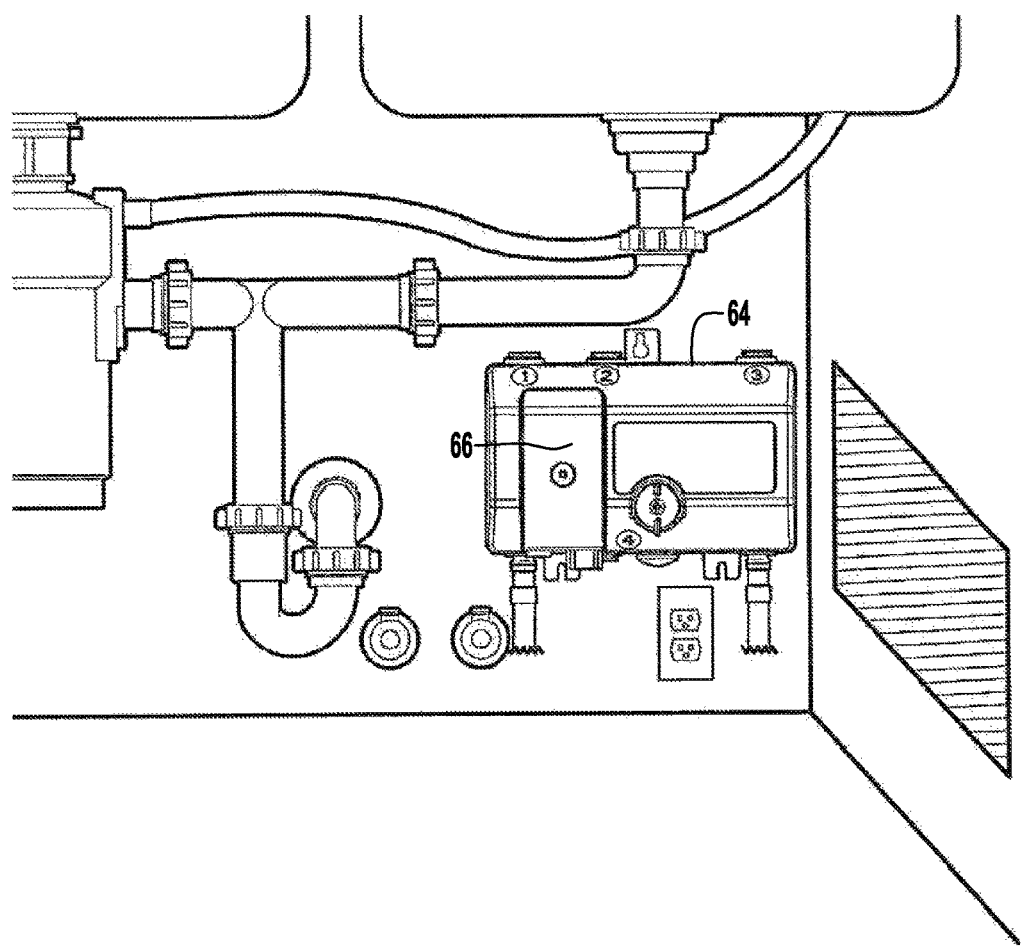
FIG. 15 is a schematic illustration of the flow module and the electronics module of the electronic faucet of FIG. 3 mounted beneath a sink.

Due to the use of the flow module 64 in conjunction with the hose bracket 174, the flow module 64 can be mounted in multiple locations beneath the mounting surface without affecting the operation of the wand 20. As shown in FIG. 15, the flow module 64 is mounted on a back wall of a space beneath the sink. Alternatively, the flow module 64 can be mounted on a side wall of the space beneath the sink (as shown by the rectangle with hatched lines in FIG. 15).

To install the hose bracket 174 in the faucet 12, the hose bracket 174 is connected to the wand hose 18 that delivers water from the flow module 64 to the wand 20 (also referred to as the common portion 52 of the mixed water line 30). More specifically, the guide portion 178 of the hose bracket 174 is clamped onto the wand hose 18. Additionally, the hose bracket 174 is connected to the mounting shank 164. More specifically, the mounting portion 176 of the hose bracket 174 is threaded onto the mounting shank 164.

Figure 17:
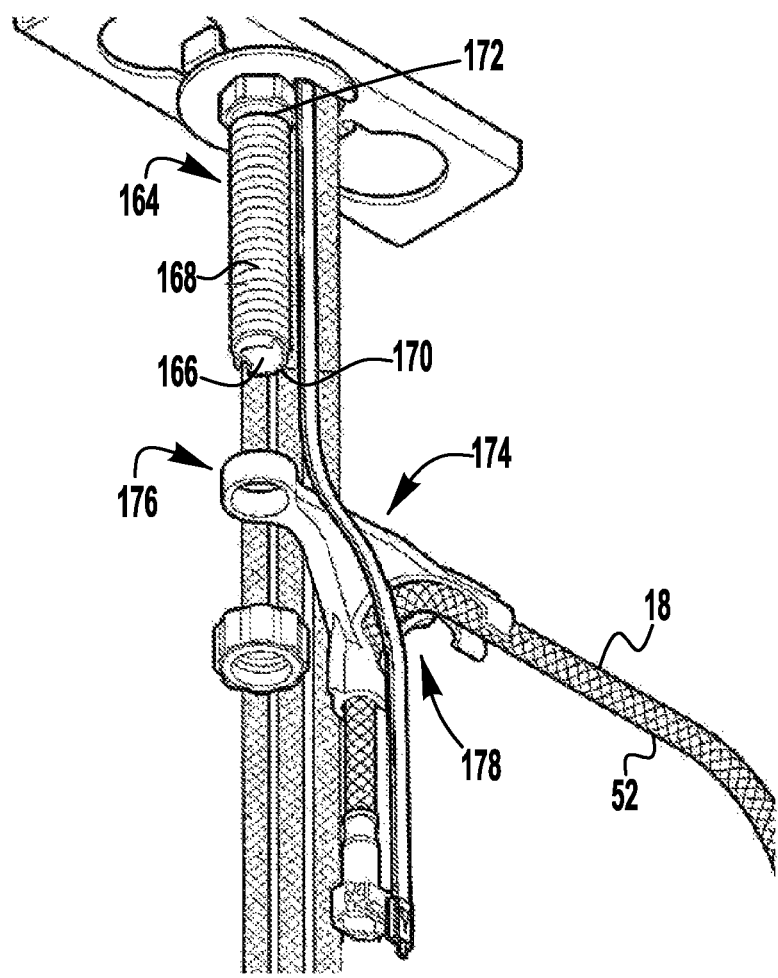
FIG. 17 is a perspective view of the hose bracket of FIG. 14 after being connected to the flexible hose, but before being connected to a mounting shank.
Figure 18:
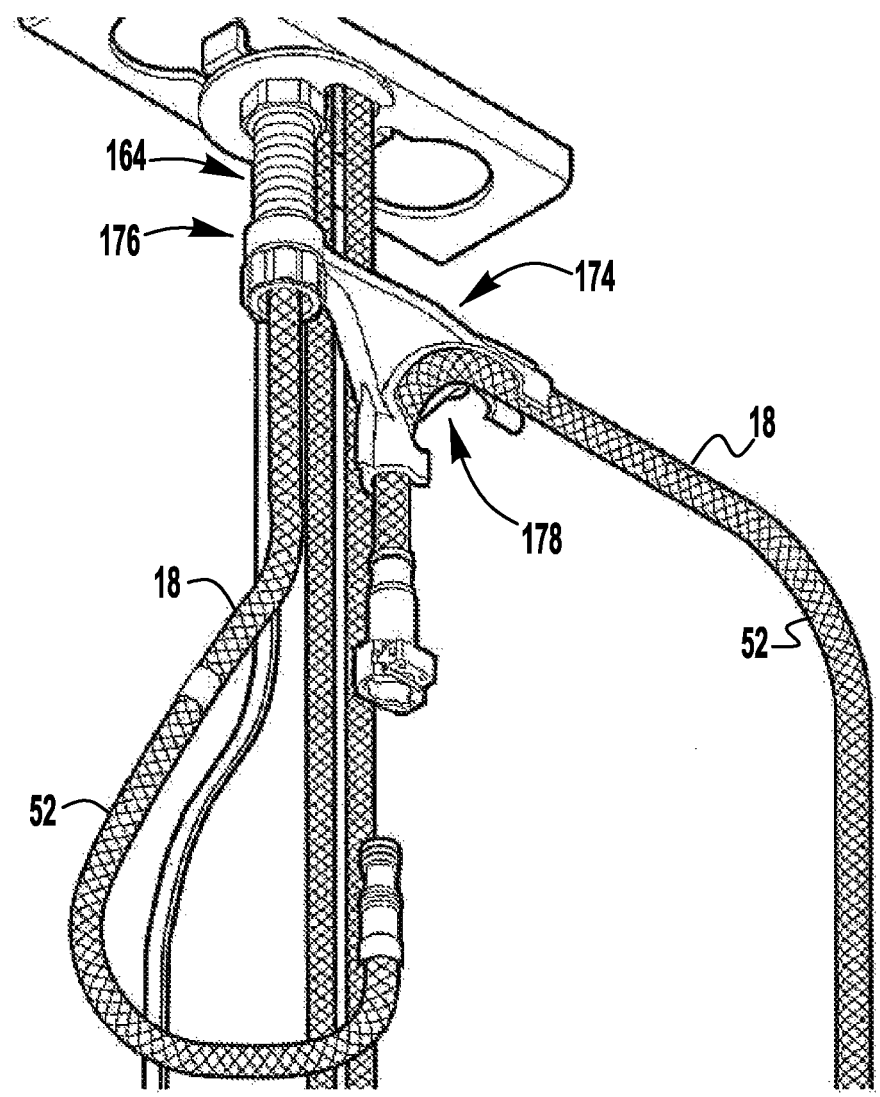
FIG. 18 is a perspective view of the hose bracket of FIG. 14 after being connected to the flexible hose and the mounting shank, but before flexible hoses are connected to each other.
Figure 19:
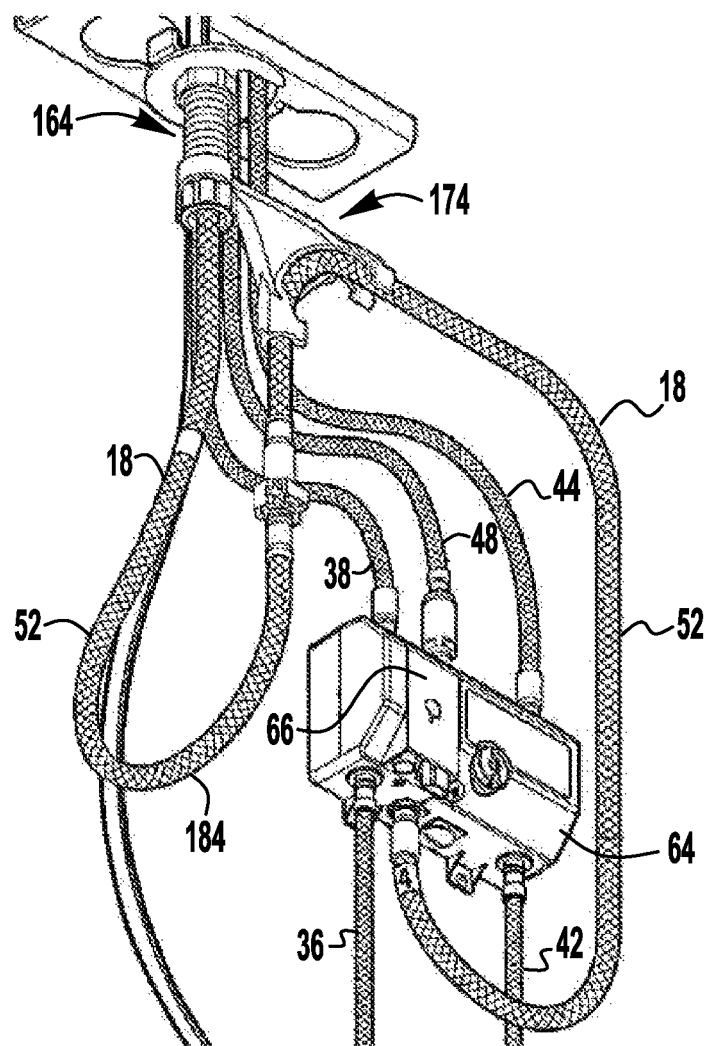
FIG. 19 is a perspective view of the flow module, the electronics module, and the hose bracket of the electronic faucet of FIG. 3 after being completely assembled and installed beneath a mounting surface.

FIG. 16 shows the hose bracket 174 before being connected to the wand hose 18. FIG. 17 shows the hose bracket 174 after being connected to the wand hose 18, but before being connected to the mounting shank 164. FIG. 18 shows the hose bracket 174 after being connected to both the wand hose 18 and the mounting shank 164, but before the two hoses of the wand hose 18 are connected to each other. Finally, FIG. 19 shows the flow module 64 and the hose bracket 174 after being completely assembled and installed beneath the mounting surface.

As used herein, "activate a valve" means to move the valve to or maintain the valve in an open position, regardless of the volume or temperature of the flowing water, "deactivate a valve" means to move the valve to a completely closed position, and "trigger a sensor" means the sensor detects a stimulus (e.g., the presence of an object) and sends a signal to activate or deactivate a valve in response to that detection.

During operation of the mechanical valve 32, the user activates and deactivates the mechanical valve 32 using the handle 22. When the user manually moves the handle 22 to an open position, the mechanical valve 32 is activated. While the mechanical valve 32 is activated, the faucet 12 operates as a standard faucet. As with standard faucets, the user can control the volume and temperature of the flowing water by further manually moving the handle 22 in the open position. Additionally, while the mechanical valve 32 is activated, the electronic valve 34 cannot be activated by the user. This can be accomplished by preventing the electronic valve 34 from opening or preventing the toggle sensor 70 and the presence sensor 72 from triggering. When the user manually moves the handle 22 to a closed position, the mechanical valve 32 is deactivated. While the mechanical valve 32 is deactivated, the electronic valve 34 can be activated and deactivated and the toggle sensor 70 and the presence sensor 72 can be triggered by the user.

During operation of the electronic valve 34, the user activates and deactivates the electronic valve 34 using the toggle sensor 70 and/or the presence sensor 72.

When the user triggers the toggle sensor 70 (i.e., when an object enters the toggle zone 74), the electronic valve 34 is activated. In an exemplary embodiment, the user cannot electronically control the volume and temperature of the flowing water. When the user again triggers the toggle sensor 70 (i.e., when the object exits and reenters the toggle zone 74), the electronic valve 34 is deactivated. Successive triggering of the toggle sensor 70 alternately activates and deactivates the electronic valve 34.

Additionally, when the user triggers the presence sensor 72 (i.e., when an object enters the presence zone 76), the electronic valve 34 is activated. In an exemplary embodiment, the user cannot electronically control the volume and temperature of the flowing water. When the user no longer triggers the presence sensor 72 (i.e., when the object exits the presence zone 76), the electronic valve 34 is deactivated.

When reference is made to activating or deactivating a valve "when a sensor is triggered," the valve may be activated or deactivated immediately upon the sensor triggering or a predetermined period of time after the sensor has triggered. Similarly, when reference is made to activating or deactivating a valve "when an object enters a zone" or "when an object exits a zone," the valve may be activated or deactivated immediately upon the object entering or exiting the zone or a predetermined period of time after the object has entered or exited the zone.

In an exemplary embodiment, while the electronic valve 34 is activated, the user cannot electronically control the volume and temperature of the flowing water. Instead, the volume and/or temperature of the flowing water are mechanically controlled by mechanical apparatus in the electronic valve portion 40 of the hot water line 26, the electronic valve portion 46 of the cold water line 28, and/or the electronic valve portion 50 of the mixed water line 30. In the illustrated embodiments, the mechanical apparatus includes a mechanical mixing valve 186 in the electronic valve portion 40 of the hot water line 26 and the electronic valve portion 46 of the cold water line 28. In another exemplary embodiment, the mechanical apparatus includes a throttle or choke valve in the electronic valve portion 40 of the hot water line 26 and the electronic valve portion 46 of the cold water line 28. However, one of ordinary skill in the art will appreciate that, in certain embodiments, the faucet 12 could include a mixing and volume controlling electronic valve 34 together with additional sensors and/or a user interface that would enable the user to electronically control the volume and/or temperature of the flowing water.

Due to the use of the electronic valve 34 in conjunction with the mechanical apparatus to mechanically control the volume and/or temperature of the flowing water while the electronic valve 34 is activated, the electronic valve 34 can be in parallel with the mechanical valve 32 while still providing volume and/or temperature control for the electronic valve 34.

One of ordinary skill in the art will now appreciate that the present invention provides an electronic plumbing fixture fitting. Although the present invention has been shown and described with reference to a particular embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
    a housing, the housing being operable to mount above a mounting surface, the housing including a spout and a wand, the wand being operable to pull away from the spout, the wand including a discharge outlet operable to deliver water;
    a mounting shank, the mounting shank being operable to extend downwardly from the housing, the mounting shank being operable to extend through and below the mounting surface, the mounting shank having a hollow interior, the mounting shank having an inlet;
    an electronic valve, the electronic valve being operable to permit flow of water through the discharge outlet when the electronic valve is activated and to not permit flow of water through the discharge outlet when the electronic valve is deactivated;
    a flow module, the flow module being operable to mount below the mounting surface, when mounted, the flow module being located upstream of the mounting shank, the electronic valve being located inside the flow module, the flow module including:
        a cold water inlet operable to receive cold water from a cold water supply,
        a cold water passage operable to fluidly connect the cold water inlet and the electronic valve,
        a hot water inlet operable to receive hot water from a hot water supply,
        a hot water passage operable to fluidly connect the hot water inlet and the electronic valve,
        a mixed water outlet operable to discharge mixed water to the discharge outlet, and
        a mixed water passage operable to fluidly connect the electronic valve and the mixed water outlet;
    a wand hose, the wand hose being operable to fluidly connect the mixed water outlet of the flow module and the wand, the wand hose extending below the mounting surface and through the mounting shank and the spout; and
    a hose bracket, the hose bracket being operable to connect to the mounting shank and to the wand hose, the hose bracket being operable to position the wand hose between the mixed water outlet of the flow module and the inlet of the mounting shank such that a first portion of the wand hose extends in a loop between the hose bracket and the inlet of the mounting shank;
    wherein the hose bracket includes a mounting portion that is operable to thread onto the mounting shank;
    when installed, the hose bracket being in direct contact with a second portion of the wand hose between the mixed water outlet of the flow module and the inlet of the mounting shank, and the hose bracket not being in direct contact with the first portion of the wand hose extending in the loop between the hose bracket and the inlet of the mounting shank; and
    during operation, when the wand is pulled away from the spout, the wand hose does not move through the hose bracket.

2. The electronic plumbing fixture fitting of claim 1, wherein the hose bracket includes a guide portion that is operable to clamp onto the wand hose.

3. The electronic plumbing fixture fitting of claim 1, further including:
    a sensor, the sensor being operable to send a signal when the electronic valve is to be activated; and
    an electronics module, the electronics module being operable to receive the signal from the sensor when the electronic valve is to be activated and, in response, send a signal to the electronic valve to activate the electronic valve, the electronics module being operable to connect to the flow module.

4. The electronic plumbing fixture fitting of claim 1, further including:
    a mechanical valve, the mechanical valve being operable to permit flow of water through the discharge outlet when the mechanical valve is opened and to not permit flow of water through the discharge outlet when the mechanical valve is closed, the mechanical valve being located outside the flow module;
    wherein the flow module further includes:
        a cold water outlet operable to discharge cold water to the mechanical valve,
        a cold water passage operable to fluidly connect the cold water inlet and the cold water outlet,
        a hot water outlet operable to discharge hot water to the mechanical valve, a hot water passage operable to fluidly connect the hot water inlet and the hot water outlet, a mixed water inlet operable to receive mixed water from the mechanical valve, and a mixed water passage operable to fluidly connect the mixed water inlet and the mixed water outlet.

5. The electronic plumbing fixture fitting of claim 4, wherein:

the flow module includes a first side and a second side, the first side being opposite the second side;

the cold water inlet, the hot water inlet, and the mixed water outlet are located in the first side of the flow module; and the cold water outlet, the hot water outlet, and the mixed water inlet are located in the second side of the flow module.

6. The electronic plumbing fixture fitting of claim 1, wherein edges of the flow module are chamfered.

7. The electronic plumbing fixture fitting of claim 1, wherein the wand hose includes a connector operable to fluidly connect the wand hose portions.

8. An electronic plumbing fixture fitting, comprising:

a housing, the housing being operable to mount above a mounting surface, the housing including a spout and a wand, the wand being operable to pull away from the spout, the wand including a discharge outlet operable to deliver water;

a mounting shank, the mounting shank being operable to extend downwardly from the housing, the mounting shank being operable to extend through and below the mounting surface, the mounting shank having a hollow interior, the mounting shank having an inlet;

an electronic valve, the electronic valve being operable to permit flow of water through the discharge outlet when the electronic valve is activated and to not permit flow of water through the discharge outlet when the electronic valve is deactivated;

a flow module, the flow module being operable to mount below the mounting surface, when mounted, the flow module being located upstream of the mounting shank, the electronic valve being located inside the flow module, the flow module including:

a cold water inlet operable to receive cold water from a cold water supply, a cold water passage operable to fluidly connect the cold water inlet and the electronic valve, a hot water inlet operable to receive hot water from a hot water supply, a hot water passage operable to fluidly connect the hot water inlet and the electronic valve, a mixed water outlet operable to discharge mixed water to the discharge outlet, and a mixed water passage operable to fluidly connect the electronic valve and the mixed water outlet;

a wand hose, the wand hose being operable to fluidly connect the mixed water outlet of the flow module and the wand, the wand hose extending below the mounting surface and through the mounting shank and the spout; and a hose bracket, the hose bracket being operable to connect to the mounting shank and to the wand hose, the hose bracket being operable to position the wand hose between the mixed water outlet of the flow module and the inlet of the mounting shank such that a first portion of the wand hose extends in a loop between the hose bracket and the inlet of the mounting shank;

wherein the hose bracket includes a mounting portion that is operable to thread onto the mounting shank, and a guide portion that is operable to connect to the wand hose;

when installed, the hose bracket being in direct contact with a second portion of the wand hose between the mixed water outlet of the flow module and the inlet of the mounting shank, and the hose bracket not being in direct contact with the first portion of the wand hose extending in the loop between the hose bracket and the inlet of the mounting shank; and during operation, when the wand is pulled away from the spout, the wand hose does not move through the hose bracket.

9. The electronic plumbing fixture fitting of claim 8, wherein the guide portion is operable to clamp onto the wand hose.

10. The electronic plumbing fixture fitting of claim 8, further including:

a sensor, the sensor being operable to send a signal when the electronic valve is to be activated; and an electronics module, the electronics module being operable to receive the signal from the sensor when the electronic valve is to be activated and, in response, send a signal to the electronic valve to activate the electronic valve, the electronics module being operable to connect to the flow module.

11. The electronic plumbing fixture fitting of claim 8, further including:

a mechanical valve, the mechanical valve being operable to permit flow of water through the discharge outlet when the mechanical valve is opened and to not permit flow of water through the discharge outlet when the mechanical valve is closed, the mechanical valve being located outside the flow module;

wherein the flow module further includes:

a cold water outlet operable to discharge cold water to the mechanical valve, a cold water passage operable to fluidly connect the cold water inlet and the cold water outlet, a hot water outlet operable to discharge hot water to the mechanical valve, a hot water passage operable to fluidly connect the hot water inlet and the hot water outlet, a mixed water inlet operable to receive mixed water from the mechanical valve, and a mixed water passage operable to fluidly connect the mixed water inlet and the mixed water outlet.

12. The electronic plumbing fixture fitting of claim 11, wherein:

the flow module includes a first side and a second side, the first side being opposite the second side;

the cold water inlet, the hot water inlet, and the mixed water outlet are located in the first side of the flow module; and the cold water outlet, the hot water outlet, and the mixed water inlet are located in the second side of the flow module.

13. The electronic plumbing fixture fitting of claim 8, wherein edges of the flow module are chamfered.

14. The electronic plumbing fixture fitting of claim 8, wherein the wand hose includes a connector operable to fluidly connect the wand hose portions.

15. An electronic plumbing fixture fitting, comprising:

a housing, the housing being operable to mount above a mounting surface, the housing including a spout and a wand, the wand being operable to pull away from the spout, the wand including a discharge outlet operable to deliver water;

a mounting shank, the mounting shank being operable to extend downwardly from the housing, the mounting shank being operable to extend through and below the mounting surface, the mounting shank having a hollow interior, the mounting shank having an inlet;

an electronic valve, the electronic valve being operable to permit flow of water through the discharge outlet when the electronic valve is activated and to not permit flow of water through the discharge outlet when the electronic valve is deactivated;

a flow module, the flow module being operable to mount below the mounting surface, when mounted, the flow module being located upstream of the mounting shank, the electronic valve being located inside the flow module, the flow module including:
   a cold water inlet operable to receive cold water from a cold water supply,
   a cold water passage operable to fluidly connect the cold water inlet and the electronic valve,
   a hot water inlet operable to receive hot water from a hot water supply,
   a hot water passage operable to fluidly connect the hot water inlet and the electronic valve,
   a mixed water outlet operable to discharge mixed water to the discharge outlet, and
   a mixed water passage operable to fluidly connect the electronic valve and the mixed water outlet;

a wand hose, the wand hose being operable to fluidly connect the mixed water outlet of the flow module and the wand, the wand hose extending below the mounting surface and through the mounting shank and the spout; and a hose bracket, the hose bracket being operable to connect to the mounting shank and to the wand hose, the hose bracket being operable to position the wand hose between the mixed water outlet of the flow module and the inlet of the mounting shank such that a first portion of the wand hose extends in a loop between the hose bracket and the inlet of the mounting shank;

wherein the hose bracket includes a mounting portion that is operable to thread onto the mounting shank;

when installed, the hose bracket being in direct contact with a second portion of the wand hose by being clamped on the wand hose between the mixed water outlet of the flow module and the inlet of the mounting shank, and the hose bracket not being in direct contact with the first portion of the wand hose extending in the loop between the hose bracket and the inlet of the mounting shank; and during operation, when the wand is pulled away from the spout, the wand hose does not move through the hose bracket.

16. The electronic plumbing fixture fitting of claim 15, wherein the hose bracket includes a guide portion that is operable to clamp onto the wand hose.

17. The electronic plumbing fixture fitting of claim 15, further including:
   a mechanical valve, the mechanical valve being operable to permit flow of water through the discharge outlet when the mechanical valve is opened and to not permit flow of water through the discharge outlet when the mechanical valve is closed, the mechanical valve being located outside the flow module;
   wherein the flow module further includes:
      a cold water outlet operable to discharge cold water to the mechanical valve,
      a cold water passage operable to fluidly connect the cold water inlet and the cold water outlet,
      a hot water outlet operable to discharge hot water to the mechanical valve,
      a hot water passage operable to fluidly connect the hot water inlet and the hot water outlet,
      a mixed water inlet operable to receive mixed water from the mechanical valve, and
      a mixed water passage operable to fluidly connect the mixed water inlet and the mixed water outlet.

18. The electronic plumbing fixture fitting of claim 15, further including:
   a sensor, the sensor being operable to send a signal when the electronic valve is to be activated; and
   an electronics module, the electronics module being operable to receive the signal from the sensor when the electronic valve is to be activated and, in response, send a signal to the electronic valve to activate the electronic valve, the electronics module being operable to connect to the flow module.

19. The electronic plumbing fixture fitting of claim 17, wherein:
   the flow module includes a first side and a second side, the first side being opposite the second side;
   the cold water inlet, the hot water inlet, and the mixed water outlet are located in the first side of the flow module; and
   the cold water outlet, the hot water outlet, and the mixed water inlet are located in the second side of the flow module.

20. The electronic plumbing fixture fitting of claim 15, wherein edges of the flow module are chamfered.

21. The electronic plumbing fixture fitting of claim 15, wherein the wand hose includes a connector operable to fluidly connect the wand hose portions.

* * * * *